US009037168B2

(12) United States Patent
Hsu et al.

(10) Patent No.: US 9,037,168 B2
(45) Date of Patent: May 19, 2015

(54) MULTIPLE SUBSCRIPTION RESOURCE ACCESS CONTROL

(71) Applicant: QUALCOMM Incorporated, San Diego, CA (US)

(72) Inventors: Chih-Ping Hsu, San Diego, CA (US); Simon Walke, Basingstroke (GB); Shawn C. Morrison, Boulder, CO (US); Francis M. Ngai, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 13/953,969

(22) Filed: Jul. 30, 2013

(65) Prior Publication Data

US 2013/0316718 A1  Nov. 28, 2013

Related U.S. Application Data

(63) Continuation-in-part of application No. 13/235,086, filed on Sep. 16, 2011, now Pat. No. 8,626,179.

(60) Provisional application No. 61/450,418, filed on Mar. 8, 2011.

(51) Int. Cl.
*H04W 4/00* (2009.01)
*H04W 8/18* (2009.01)
(Continued)

(52) U.S. Cl.
CPC .......... *H04W 72/1278* (2013.01); *H04W 88/06* (2013.01); *H04W 68/02* (2013.01); *H04W 8/183* (2013.01)

(58) Field of Classification Search
CPC ... H04W 88/06; H04W 68/02; H04W 28/044; H04W 28/046; H04W 4/08; H04W 36/08; H04W 48/08; H04W 48/10; H04W 4/06; H04W 48/20; H04W 4/22; H04W 28/18; H04W 28/24; H04W 4/10; H04W 52/0277

USPC .............. 455/411, 419, 435.2, 436, 442, 445, 455/450, 458, 515, 517, 524, 550.1, 552.1, 455/404.1, 558, 405, 434, 452.1, 574, 455/422.1, 435.1, 452.2, 453, 454, 518; 370/328, 329, 331, 335, 352

See application file for complete search history.

(56) References Cited

U.S. PATENT DOCUMENTS 7,016,678 B1   3/2006   Kalliokulju et al.
8,170,616 B2   5/2012   Lee
(Continued)

FOREIGN PATENT DOCUMENTS

EP    1131973 B1    4/2003
WO    2010140781 A2    12/2010

OTHER PUBLICATIONS

Ahmed, Z., et al., "A Navigation Device with MAC Supporting Multiple Physical Networks for Extended Coverage and Operations", IEEE Transactions on Consumer Electronics, vol. 54, No. 3, Aug. 2008; 7 pp.
(Continued)

*Primary Examiner* — Inder Mehra
(74) *Attorney, Agent, or Firm* — The Marbury Law Group, PLLC

(57) ABSTRACT

The various embodiments include methods for managing how a MSMS communication device that is accessing an arbitrary combination of multiple telephony networks processes paging collisions. The embodiment methods promote improving a subscription's page blocking rate by causing a MSMS communication device to implement a retransmission remedial action for a blocked subscription. In the various embodiments, the MSMS communication device may implement the retransmission remedial action by increasing a blocked subscription's priority during a subsequent retransmission interval to increase the likelihood that the blocked subscription will receive a repeated page message from its mobile network during this retransmission interval. In some embodiments, the blocked subscription's current priority may be based on the number of retransmission intervals that are presently occurring.

12 Claims, 13 Drawing Sheets

(51) Int. Cl.
  *H04W 68/00* (2009.01)
  *H04W 72/00* (2009.01)
  *H04W 72/04* (2009.01)
  *H04W 72/12* (2009.01)
  *H04W 68/02* (2009.01)
  *H04W 88/06* (2009.01)

(56) References Cited

U.S. PATENT DOCUMENTS

| | | |
|---|---|---|
| 8,204,516 B2 | 6/2012 | Hsu |
| 8,244,301 B2 | 8/2012 | Shi |
| 8,290,518 B2 | 10/2012 | Fang et al. |
| 2001/0034233 A1 | 10/2001 | Tiedemann et al. |
| 2003/0125073 A1* | 7/2003 | Tsai et al. ............... 455/552 |
| 2003/0181216 A1* | 9/2003 | Tsai et al. ............... 455/517 |
| 2006/0052066 A1 | 3/2006 | Cleveland et al. |
| 2006/0189346 A1 | 8/2006 | Turner et al. |
| 2006/0209801 A1 | 9/2006 | Joshi et al. |
| 2007/0197234 A1 | 8/2007 | Gill et al. |
| 2008/0075039 A1 | 3/2008 | Srinivas et al. |
| 2008/0102815 A1 | 5/2008 | Sengupta et al. |
| 2008/0182615 A1 | 7/2008 | Xue et al. |
| 2009/0131054 A1 | 5/2009 | Zhang |
| 2009/0156256 A1 | 6/2009 | Shi |
| 2009/0186651 A1* | 7/2009 | You ............................ 455/552.1 |
| 2010/0130237 A1 | 5/2010 | Kitazoe et al. |
| 2010/0261487 A1 | 10/2010 | Razdan |
| 2010/0279698 A1 | 11/2010 | Wong |
| 2010/0317403 A1* | 12/2010 | Mizuo ......................... 455/558 |
| 2011/0081951 A1 | 4/2011 | Hwang |
| 2011/0117962 A1 | 5/2011 | Qiu et al. |
| 2011/0151836 A1 | 6/2011 | Dadu et al. |
| 2012/0225651 A1 | 9/2012 | Rysgaard |
| 2012/0231802 A1 | 9/2012 | Ngai |
| 2013/0150036 A1* | 6/2013 | Pattaswamy et al. ...... 455/435.1 |

OTHER PUBLICATIONS

International Search Report and Written Opinion—PCT/US2012/028127—ISA/EPO—May 3, 2012.

* cited by examiner

Persistent contentions/collisions

Pre-determined pattern for 1:1 resource allocation

| SCI = 2..... Telescoping page retransmissions....2 repeat pages at 5 sec and 15 sec after 1st page | | | | | | | | | | |
|---|---|---|---|---|---|---|---|---|---|---|
| Sub #1 gets paged | P | P | P | P | P | << Sub #1 has 2 chances | | | | |
| Wakeup # | 1 | 2 | 3 | 4 | 5 | 6 | 7 | 8 | 9 | 10 |
| Sub #1 gets lock | N | Y | N | Y | N | Y | N | Y | N | Y |
| Sub #2 gets lock | Y | N | Y | N | Y | N | Y | N | Y | N |
| Sub #2 gets paged | P | P | | P | | << Sub #2 has 1 chances | | | | Avg # pages/call = 1/2 x (2+1) = 1.5 |

*FIG. 3*

Persistent contentions/collisions

Pre-determined pattern for 2:1 resource allocation

| SCI = 2.... Telescoping page retransmissions....2 repeat pages at 5 sec and 15 sec after 1st page | | | | | | | | | | | |
|---|---|---|---|---|---|---|---|---|---|---|---|
| Sub #1 gets 1st page @ Wakeup #3 | P | | | | | P | | | | | |
| Sub #1 gets 1st page @ Wakeup #2 | | P | P | | P | | | | | | << Effective average # pages per call for Sub #1 = 1/3 × (0 + 1 + 2) = 1.... And expect miss 1/3 of calls |
| Sub #1 gets 1st page @ Wakeup #1 | P | P | | P | | | | | | | |
| Wakeup # | 1 | 2 | 3 | 4 | 5 | 6 | 7 | 8 | 9 | 10 | |
| Sub #1 gets lock | N | N | Y | N | N | Y | N | N | Y | N | |
| Sub #2 gets lock | Y | Y | N | Y | Y | N | Y | Y | N | Y | |
| Sub #2 gets 1st page @ Wakeup #1 | P | P | | P | | | | | | | << Effective average # pages per call for Sub #2 = 1/3 × (3 + 2 + 1) = 2 |
| Sub #2 gets 1st page @ Wakeup #2 | | P | P | | P | | | | | | |
| Sub #2 gets 1st page @ Wakeup #3 | | | P | P | | P | | | | | |

*FIG. 4*

MULTIPLE SUBSCRIPTION RESOURCE ACCESS CONTROL

RELATED APPLICATIONS

This application is a continuation-in-part of U.S. patent application Ser. No. 13/235,086, entitled "Multiple Subscription Resource Access Control" filed Sep. 16, 2011, which claims the benefit of priority to U.S. Provisional Patent Application No. 61/450,418 entitled "Multiple Subscription Resource Access Control" filed on Mar. 8, 2011, all of which are assigned to the assignee hereof and are hereby expressly incorporated herein by reference in their entirety.

FIELD

The present disclosure is generally related to devices that support multiple subscriptions that share signal processing resources.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application that can be used to access the Internet. As such, these wireless telephones can include significant computing capabilities.

A mobile communication device (e.g., a wireless telephone) may enable a user to utilize multiple subscriptions (that may be associated with the same or different networks). To illustrate, a first subscriber identity module (SIM) of a dual-SIM dual-standby (DSDS) device may be associated with a first subscription and a second SIM may be associated with a second subscription. In a DSDS device with a single receive-transmit (Rx-Tx) chain, there may be contention between subscriptions in accessing one or more shared radio frequency (RF) resources of the single Rx-Tx chain. For example, when there is a contention for access to a shared RF resource (e.g., a paging collision), a first subscription may be granted access to the shared RF resource (i.e., "win") over a second subscription. As a result, the second subscription may "lose" and get "whatever's left," potentially resulting in degradation of performance of the second subscription. While DSDS devices may support dual-subscription concurrency by using two separate dedicated Rx-Tx chains for the two subscriptions, this may lead to a higher bill of materials (BOM) and a larger printed circuit board (PCB) area.

SUMMARY

Performance of one subscription (e.g., a secondary subscription) of a device that supports multiple subscriptions may be degraded compared to another subscription (e.g., a primary subscription) as a result of contention for one or more shared signal processing resources (e.g., RF resources). Application of a remedial action policy and use of historical information related to subscription access to a signal processing resource may improve the performance of the secondary subscription. That is, one or more remedial actions may be taken in order to improve a user experience and call performance associated with the primary and secondary subscriptions.

In particular embodiment, a method includes receiving a first set of requests to access a signal processing resource (e.g., a radio frequency (RF) resource) of a device (that supports multiple subscriptions) during a first time period. Each subscription may be associated with its own user identity module, or each subscription may be associated with a common user identity module. For example, the device may include a first subscriber identity module (SIM) associated with a first subscription and a second SIM associated with a second subscription. At least one of the requests received during the first time period is related to the first subscription, and at least one of the requests is related to the second subscription. During the first time period, the first subscription is granted access to the signal processing resource and the second subscription is denied access to the signal processing resource. A second set of requests to access the signal processing resource are received during a second time period. At least one of the requests received during the second time period is related to the first subscription, and at least one of the requests is related to the second subscription. The method includes determining whether to grant access to the signal processing resource to the second subscription during the second time period and to deny access to the signal processing resource to the first subscription during the second time period. The determination may be based on a remedial action policy and evaluation of historical information related to subscription access to the signal processing resource. When access to the signal processing resource is granted to the second subscription during the second time period, hysteresis may be used to determine whether to grant access to the signal processing resource to the first subscription during a third time period after the second time period in order to preserve paging performance of the first subscription.

In another particular embodiment, an apparatus includes a signal processing resource, a first SIM interface, a second SIM interface, and a controller. The first SIM interface, the second SIM interface, and the controller are communicatively coupled to the signal processing resource. The first SIM interface is configured to receive a first SIM associated with a first subscription, and the second SIM interface is configured to receive a second SIM associated with a second subscription. During a first time period, a first set of requests to access the signal processing resource may be received. At least one of the requests received during the first time period is related to the first subscription, and at least one of the requests is related to the second subscription. The controller is configured to grant access to the signal processing resource to the first subscription during the first time period and to deny access to the signal processing resource to the second subscription during the first time period. During a second time period, a second set of requests to access the signal processing resource may be received. At least one of the requests received during the second time period is related to the first subscription, and at least one of the requests is related to the second subscription. The controller is configured to determine, based on a remedial action policy and based on historical information related to subscription access to the signal processing resource, whether to grant access to the signal processing resource to the second subscription during the second time period. When access to the signal processing resource is granted to the second subscription during the second time period, hysteresis may be used to determine whether to grant access to the signal processing resource to the first subscription during a third time period after the second time period in order to preserve paging performance of the first subscription.

In another particular embodiment, an apparatus includes means for receiving a first SIM that is associated with a first subscription and means for receiving a second SIM that is associated with a second subscription. The apparatus further includes means for receiving a first set of requests to access a signal processing resource during a first time period. At least one of the requests is related to the first subscription and at least one of the requests is related to the second subscription. The apparatus includes means for granting access to the signal processing resource to the first subscription and denying access to the second subscription during the first time period. The apparatus includes means for receiving a second set of requests to access the signal processing resource during a second time period, where at least one request is related to the first subscription and at least one request is related to the second subscription. The apparatus further includes means for determining whether to grant access to the signal processing resource to the second subscription (and to deny access to the signal processing resource to the first subscription) during the second time period. The determination may be based on a remedial action policy and based on historical information related to subscription access to the signal processing resource. When access to the signal processing resource is granted to the second subscription during the second time period, hysteresis may be used to determine whether to grant access to the signal processing resource to the first subscription during a third time period after the second time period in order to preserve paging performance of the first subscription.

One particular advantage provided by at least one of the disclosed embodiments is that performance of a dual-subscription device (e.g., a dual-SIM dual-standby device) with a single Rx-Tx chain may be improved. For example, one or more remedial actions may be taken to improve the performance of a subscription that may be degraded as a result of contention for one or more shared signal processing resources. Hysteresis may be used to preserve paging performance of a particular subscription (e.g., a higher priority subscription).

Further embodiments include methods for managing how a multi-SIM-multi-standby communication device (i.e., a MSMS communication device) that is accessing an arbitrary combination of multiple telephony networks processes paging collisions. The embodiment methods promote improving a subscription's page blocking rate by causing a MSMS communication device to implement a retransmission remedial action for a blocked subscription. In various embodiments, the MSMS communication device may implement the retransmission remedial action by increasing a blocked subscription's priority during a subsequent retransmission interval to increase the likelihood that the blocked subscription will receive a repeated page message from its mobile network during this retransmission interval. In some embodiments, the blocked subscription's current priority may be based on the number of retransmission intervals that are presently occurring.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 3 is a chart that illustrates a first particular embodiment of a method of arbitrating access to a shared signal processing resource of a dual-subscription device;

FIG. 4 is a chart that illustrates a second particular embodiment of a method of arbitrating access to a shared signal processing resource of a dual-subscription device;

DETAILED DESCRIPTION

The present disclosure relates to resolution of contention for one or more signal processing resources (e.g., RF resources) in devices that support multiple subscriptions (e.g., multi-subscription devices). As an example, a device that supports two subscriptions (e.g., a DSDS device) may share one receive-transmit (Rx-Tx) chain. Each subscription may request RF resources for a set of reasons, and each reason may be associated with a numeric priority and a duration. A "collision" may occur when there is an overlap in the durations requested by the two subscriptions. Such collisions may be transient or persistent in nature. By arbitrating access to the RF resources, performance may be improved in order to provide a user experience that is closer to a device that supports a single subscription. Further, by arbitrating access to the RF resources, performance of a secondary subscription may be improved. Hysteresis may be used so that paging performance of the primary subscription is not degraded below an acceptable level as a result of the secondary subscription being granted access to the RF resources instead of the primary subscription.

Figure 1:
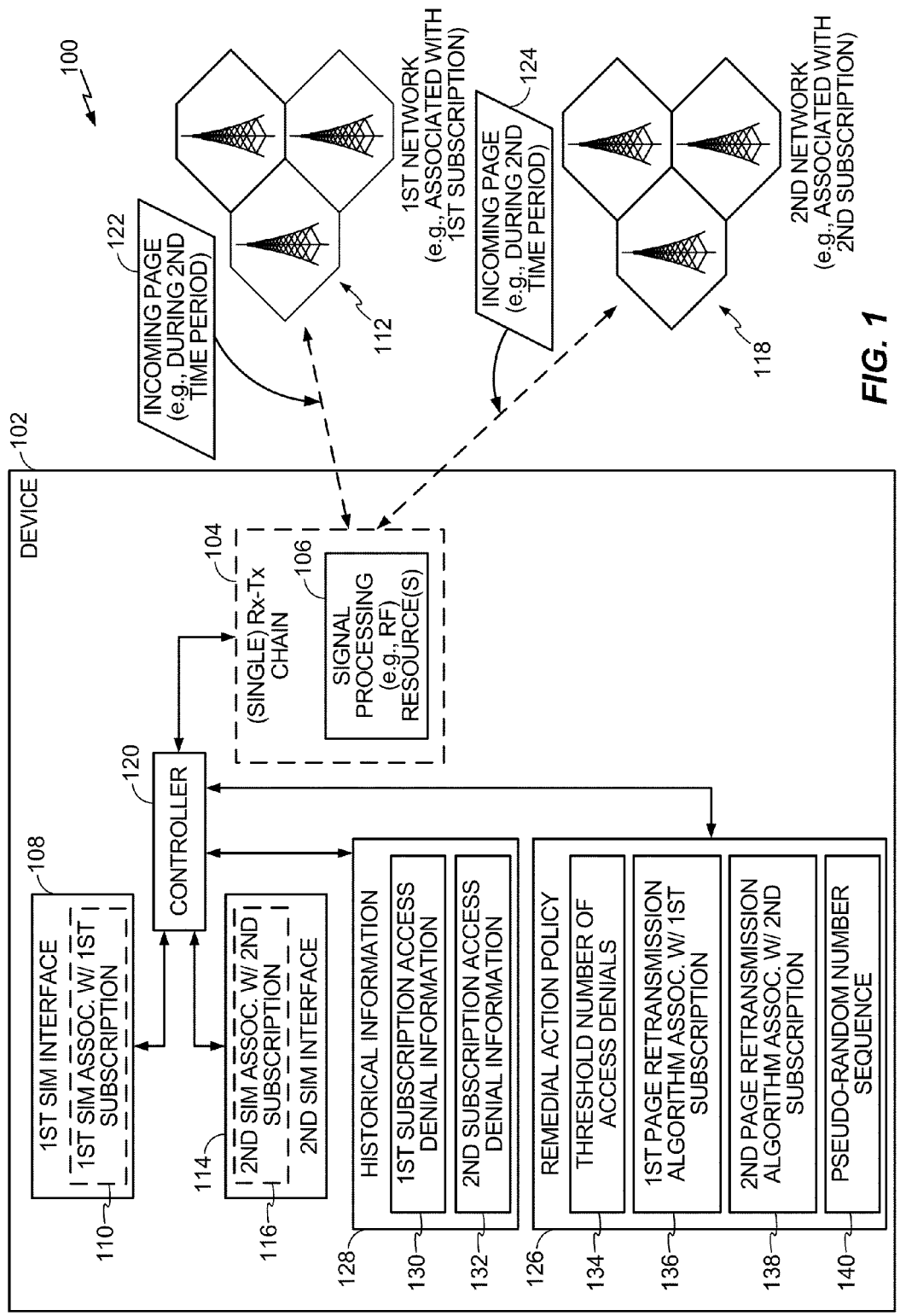
FIG. 1 is a diagram of a particular illustrative embodiment of a system of arbitrating access to a shared signal processing resource of a dual-subscription device.

Referring to FIG. 1, a particular embodiment of a system of arbitrating access to at least one shared signal processing resource of a dual-subscription device is illustrated and is generally designated 100. The system 100 includes a device 102 that supports multiple subscriptions (e.g., a mobile telephone or other communication device). For example, each subscription may be associated with its own user identity module (UIM), such as a subscriber identity module (SIM), a code division multiple access (CDMA) removable UIM (R-UIM), or other type of R-UIM. In the embodiment illustrated in FIG. 1, the device 102 is capable of receiving multiple SIMs. For example, in the embodiment illustrated in FIG. 1, the device 102 is a dual-SIM device with a single receive-transmit (Rx-Tx) chain 104 that includes at least one signal processing (e.g., RF) resource 106. The device 102 includes a first SIM interface 108 to receive a first SIM 110 that is associated with a first subscription (e.g., a subscription associated with a first network 112) and a second SIM interface 114 to receive a second SIM 116 that is associated with a second subscription (e.g., a subscription associated with a second network 118). Alternatively, the two subscriptions may be associated with the same network. For example, the SIMs 110, 116 may be plugged into or otherwise connected to the respective SIM interfaces 108, 114. The first SIM interface 108, the second SIM interface 114, and a controller 120 may be communicatively coupled to the signal processing resource 106 (e.g., via electrical connections between the SIM interfaces 108, 114, the controller 120, and the signal processing resource 106). To illustrate, a first electrical connection between the first SIM interface 108 and the signal processing resource 106 may provide a communication path between the first SIM 110 and the signal processing resource 106 when the first SIM 110 is connected to the first SIM interface 108. As another example, a second electrical connection between the second SIM interface 114 and the signal processing resource 106 may provide a communication path between the second SIM 116 and the signal processing resource 106 when the second SIM 116 is connected to the second SIM interface 114. Thus, both SIMs 110, 116 may be concurrently connected to the signal processing resource 106 (e.g., via the SIM interfaces 108, 114).

The controller 120 is configured to receive a first set of requests to access the signal processing resource 106 during a first time period. At least one of the first set of requests is related to the first subscription (e.g., associated with the first SIM 110), and at least one of the first set of requests is related to the second subscription (e.g., associated with the second SIM 116). During the first time period, the controller 120 is configured to grant access to the signal processing resource 106 to the first subscription and to deny access to the signal processing resource 106 to the second subscription. For example, the first subscription may be a higher priority subscription than the second subscription. As such, access to the signal processing resource 106 may be granted to the higher priority subscription and may be denied to a lower priority subscription.

The controller 120 is configured to receive a second set of requests to access the signal processing resource 106 during a second time period. At least one of the second set of requests is related to the first subscription and at least one of the second set of requests is related to the second subscription. The controller 120 is configured to determine, based on a remedial action policy 126 and based on historical information 128 related to subscription access to the signal processing resource 106, whether to grant access to the signal processing resource 106 to the first or second subscription during the second time period. The controller 120 may be configured to grant access to the signal processing resource 106 to the second subscription (and to deny access to the signal processing resource 106 to the first subscription) based on the determination. In this case, the second subscription "wins" the contention for access to the shared signal processing resource 106, and the first subscription "loses" the contention for access to the signal processing resource 106. In a particular embodiment, the controller 120 may be further configured to use hysteresis to determine whether to grant access to the signal processing resource 106 to the first subscription (e.g., a higher priority primary subscription) during a third time period that is after the second time period in order to preserve paging performance of the first subscription.

Figure 2:
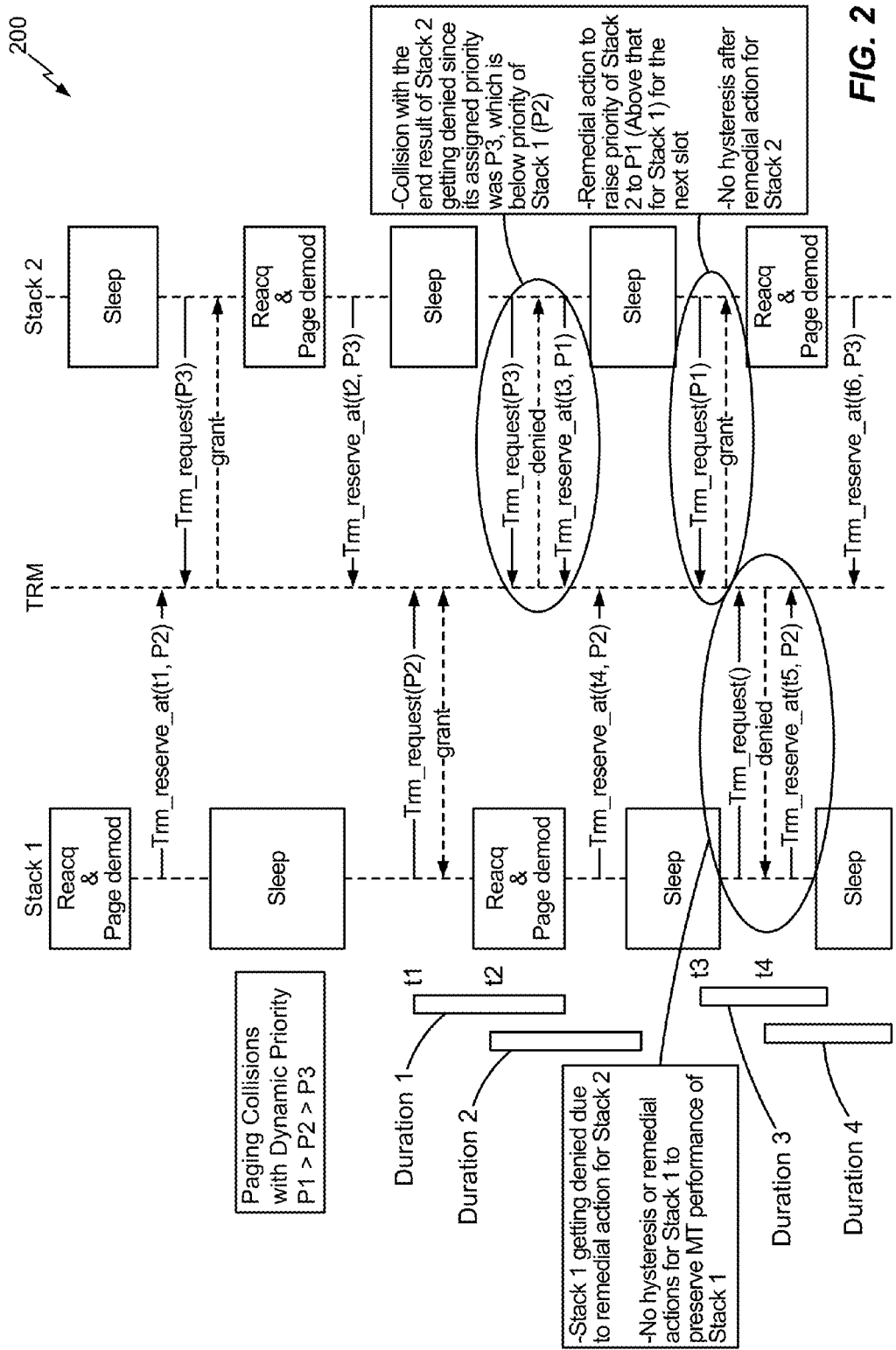
FIG. 2 is a ladder diagram of a particular illustrative embodiment of a method of performing a remedial action in response to one subscription being denied access to a shared signal processing resource of a dual-subscription device.

When requested access periods overlap, a collision takes place. Such collisions may be transient or persistent in nature. As an illustrative example (see FIG. 2), the first subscription may request access to the signal processing resource 106 at time t1 for duration 1, and the second subscription may request access to the signal processing resource 106 at time t2 for duration 2. As another illustrative example (see FIG. 2), the first subscription may request access to the signal processing resource 106 at time t4 for duration 4, and the second subscription may request access to the signal processing resource 106 at time t3 for duration 3. As shown in FIG. 2, in each case, the time periods overlap, resulting in contention for the signal processing resource 106 (e.g., collisions).

During operation of the system 100 of FIG. 1, the controller 120 may receive a first set of requests to access the signal processing resource 106 during a first time period. To illustrate, the controller 120 may receive a request from the first subscription to access the signal processing resource 106 (e.g., an RF resource) at a first time and for a first duration in order to receive an incoming page (not shown in FIG. 1) from the first network 112. The controller 120 may receive another request from the second subscription to access the signal processing resource 106 at a second time and for a second duration in order to receive an incoming page (not shown in FIG. 1) from the second network 118. The first time and the second time may be the same or different. Further, the first duration and the second duration may be the same or different. In one embodiment, the first subscription and the second subscription operate under a common slot cycle index (SCI) and hash to a common paging slot. In this case, the contention for access to the signal processing resource 106 may be considered "persistent" in nature.

When the requested access periods overlap, the controller 120 may grant access to the signal processing resource 106 to the first subscription during the first time period such that the incoming page associated with the first subscription may be received from the first network 112. The controller 120 may deny access to the signal processing resource 106 to the second subscription, such that the incoming page associated with the second subscription may be "missed" (i.e., not received from the second network 118). For example, the first subscription may be considered a higher priority subscription than the second subscription. As such, the controller 120 may grant access to the signal processing resource 106 to the first subscription over the second subscription.

The controller 120 may receive a second set of requests to access the signal processing resource 106 during a second time period. To illustrate, the controller 120 may receive a request from the first subscription to access the signal processing resource 106 at a third time and for a third duration in order to receive an incoming page 122 from the first network 112. The controller 120 may receive another request from the second subscription to access the signal processing resource 106 at a fourth time and for a fourth duration in order to receive an incoming page 124 from the second network 118. The third time and the fourth time may be the same or different, and the third duration and the fourth duration may be the same or different.

When the requested access periods overlap, the controller 120 may determine, based on a remedial action policy 126 and based on historical information 128, whether to grant access to the signal processing resource 106 to the first or second subscription during the second time period. As illustrated in FIG. 1, the historical information 128 may include at least first subscription access denial information 130 and second subscription access denial information 132. For example, the first subscription access denial information 130 may include at least information associated with the controller 120 granting access to the signal processing resource 106 to the first subscription during the first time period. As another example, the second subscription access denial information 132 may include at least information associated with the controller 120 denying access to the signal processing resource 106 to the second subscription during the first time period.

When the controller 120 grants access to the signal processing resource 106 to the second subscription during the second time period, the controller 120 may deny access to the signal processing resource 106 to the first subscription during the second time period. As a result, the incoming page 122 associated with the first subscription may be "missed" (i.e., not received from the first network 112). When the controller 120 grants access to the signal processing resource 106 to the first subscription during the second time period, the controller 120 may deny access to the signal processing resource 106 to the second subscription during the second time period. As a result, the incoming page 124 associated with the second subscription may be "missed" (i.e., not received from the second network 118).

In a particular embodiment, the remedial action policy 126 may define a threshold number of access denials 134 before the second subscription is granted access to the signal processing resource 106 during the second time period. In this case, the controller 120 may grant access to the signal processing resource 106 to the second subscription during the second time period when a number of times that the second subscription has been denied access to the signal processing resource 106 satisfies the threshold number of access denials 134. The number of times that the second subscription has been denied access to the signal processing resource 106 may be determined based on the second subscription access denial information 132. For example, the second subscription access denial information 132 may include a count of an absolute number of access denials or a count of a number of consecutive access denials. In the case of a number of consecutive access denials, the count may be reset when the second subscription is granted access to the signal processing resource 106 (e.g., during the second time period or during a subsequent time period).

The remedial action policy 126 may indicate that remedial actions may not be invoked for certain reasons or requests (e.g., a request to access the signal processing resource 106 to obtain a football game score may be denied). For example, if collisions are transient in nature and there are multiple retransmissions for non-emergency broadcast messages, the remedial action policy 126 may specify that remedial actions are not to be invoked when a subscription requested RF resources for demodulating or monitoring non-emergency broadcast messages and "lost" the contention (e.g., when the subscription was denied access to the signal processing resource 106).

In a particular embodiment, a numeric priority may be associated with various requests (or reasons associated with a request). When a numeric priority associated with a particular request (or reason for the particular request) that lost the contention is below a threshold, the remedial action policy 126 may specify that remedial actions are not to be invoked. To illustrate, a numeric priority associated with a request to access the signal processing resource 106 for a football game score may be low (e.g., a numeric priority of 10) while a numeric priority associated with a request to access the signal processing resource 106 to monitor for an incoming voice call may be high (e.g., a numeric priority of 200). The remedial action policy 126 may specify that remedial actions are not to be invoked when the numeric priority is less than a threshold value such as 100. In this case, remedial actions may not be invoked when a request to access the signal processing resource 106 for a football game score (e.g., a request with a numeric priority less than 100) lost a contention. By contrast, remedial actions may be invoked when a request to access the signal processing resource 106 to monitor for an incoming voice call (e.g., a request with a numeric priority greater than 100) lost a contention. As another example, the remedial action policy 126 may specify that remedial actions are not to be invoked when a difference in numeric priorities involved in the contention is above a threshold. The remedial action policy 126 may specify that remedial actions are not to be invoked when the difference in numeric priorities is greater than a threshold value such as 100. To illustrate, remedial actions may be invoked when a request to access the signal processing resource 106 to monitor for an incoming voice call lost a contention with a request to access the signal processing resource 106 for a football game score (e.g., a difference in numeric priorities of 190).

Thus, adaptive, dynamic, context-sensitive remedial actions may be taken for a subscription that lost an initial contention. That is, future access to the signal processing resource 106 may be granted to the subscription that lost one or more previous contentions. The access grants may occur at different points in time for different subscriptions. For page monitoring, remedial actions may take place at subsequent paging slots where repeat pages are expected. In a particular embodiment, the remedial action policy 126 may be determined at least in part based on a first page retransmission algorithm 136 associated with the first subscription and a second page retransmission algorithm 138 associated with the second subscription. The first page retransmission algorithm 136 may be determined by the first network 112, and the second page retransmission algorithm 138 may be determined by the second network 118. Thus, in this case, network specific information regarding the page retransmission algorithms 136, 138 may be required in order to implement the remedial action policy 126. Alternatively, access may be granted for the next N paging slots to the subscription that lost the initial contention in order to cover the time span of the page retransmissions. However, a large N may adversely affect the paging performance of the subscription that "won" the initial contention. In an alternative embodiment, the remedial action policy 126 may define a pseudo-random number sequence 140 that is used to determine whether to grant access to the signal processing resource 106 to the subscription that lost the initial contention during the second time period. For non-emergency broadcast monitoring, remedial actions may occur at subsequent broadcast slots, not necessarily at the next immediate broadcast slot.

If the device 102 is in a weak coverage area, enhancements to one or more modem algorithms may be made be used to improve the performance of the subscription that lost the initial contention (e.g., the second subscription). For page monitoring, losing a contention for RF resources at one paging slot may result in a longer time that elapses between a last instance of page monitoring and a next instance of page monitoring. Possible enhancements to modem algorithms may include deeper searches, earlier wakeups and more recovery mechanisms during reacquisition in slotted mode, the enablement of receive diversity (RxD) capabilities of the modem, and other techniques to enhance demodulation performance of the modem.

In a particular embodiment, when access to the signal processing resource 106 is granted to the second subscription (e.g., a lower priority subscription) during the second time period, hysteresis may be used to determine whether to grant access to the signal processing resource 106 to the first subscription (e.g., a higher priority primary subscription) during a third time period that is after the second time period in order to preserve paging performance of the first subscription. For example, the controller 120 may use the first subscription access denial information 130 to determine whether paging performance of the first subscription (e.g., the higher priority subscription) is unsatisfactory. When the paging performance is determined to be unsatisfactory, the controller 120 may grant access to the signal processing resource 106 to the first subscription during the third time period.

As an illustrative example, the third time period may include paging slots associated with the first subscription that overlap with paging slots associated with the second subscription. In this case, the controller 120 may grant access to the signal processing resource 106 to the first subscription in order to monitor the next N paging slots from the first network 112 that overlap with paging slots from the second network 118. As another illustrative example, the third time period may include a predetermined period of time to grant access to the signal processing resource 106 to the first subscription. Granting access to the first subscription during the third time period may preserve paging performance of the first subscription (e.g., the higher priority subscription).

FIG. 1 illustrates that the remedial action policy 126 and historical information 128 related to subscription access to the signal processing resource 106 may be used to improve the performance of a subscription that lost an initial contention for the signal processing resource 106. Further, when a remedial action is taken to improve the performance of the subscription that lost the initial contention, hysteresis may be used to determine whether to grant access to the signal processing resource 106 to the other subscription (e.g., a higher priority subscription) in order to preserve paging performance of the subscription.

Referring to FIG. 2, a ladder diagram illustrates a particular embodiment of a method of performing a remedial action in response to one subscription being denied access to a shared signal processing resource of a dual-subscription device and is generally designated 200.

A first subscription (e.g., associated with Stack 1) may request access to a signal processing resource (e.g., the signal processing resource 106 of FIG. 1). The first subscription sends a request to a transceiver receiver manager (TRM) to request access at time t1 for duration 1 in order to perform a reacquisition and page demodulation procedure. A priority of P2 may be assigned to the request from the first subscription. A second subscription (e.g., associated with Stack 2) may request access to the signal processing resource at time t2 for duration 2 in order to perform a reacquisition and page demodulation procedure. A lower priority of P3 may be assigned to the request from the second subscription. As shown in FIG. 2, there is an overlap in the first duration and the second duration, resulting in a contention for the signal processing resource. Based on a priority comparison, the request from the first subscription wins the contention (i.e., the access request is granted), and the request from the second subscription loses the contention (i.e., the access request is denied). As such, the second subscription is unable to perform the reacquisition and page demodulation procedure at time t2, potentially resulting in a missed page.

A remedial action may be taken to improve the performance of the second subscription after the second subscription "lost" the initial contention for the signal processing resource. The second subscription may request access to the signal processing resource at time t3 for duration 3 in order to perform a reacquisition and page demodulation procedure. The first subscription may request access to the signal processing resource at time t4 for duration 4 in order to perform a reacquisition and page demodulation procedure. As shown in FIG. 2, there is an overlap in the third duration and the fourth duration, resulting in a contention for the signal processing resource. The remedial action may include raising a priority level associated with the access request from the second subscription to P1 (above the priority level of P2 associated with the first subscription). As a result, the request from the second subscription wins the contention, and the request from the first subscription loses the contention.

If the first subscription is a primary subscription (i.e., a higher priority subscription), hysteresis may be used to preserve paging performance of the first subscription as a result of the denial of the request at time t4. For example, the signal processing resource may be granted to the paging slots of the first subscription where retransmissions after time t4 are expected, and there may be no remedial actions for the second subscription if contentions occur at these potential repeat paging slots for the first subscription. As another example, the first subscription may win the next N contentions after time t4, and there may be no remedial actions for the second subscription for these N contentions. As a further example, the first subscription may win the contentions over a time window T after time t4, and there may be no remedial actions for the second subscription if contentions occur during the time window T.

FIG. 2 illustrates that the performance of a subscription that "lost" an initial contention for a signal processing resource may be improved by raising a priority level associated with a subsequent request for access to the signal processing resource such that the subsequent access request may be granted. Further, hysteresis may be used to preserve paging performance of one subscription (e.g., a higher priority primary subscription) after a remedial action is taken to improve the performance of another subscription (e.g., a lower priority secondary subscription).

Referring to FIG. 3, a chart illustrates a particular embodiment of a method of arbitrating access to a shared signal processing resource of a dual-subscription device and is generally designated 300.

One example of persistent contentions/collisions is a code division multiple access (CDMA) plus CDMA ("C+C") case, where two subscriptions operate under the same slot cycle index (SCI) and hash to the same paging slot. A predetermined pattern of resource sharing (e.g., sharing access to the signal processing resource 106 of FIG. 1) may be adopted based on an understanding of different retransmission algorithms of different network providers. The pattern of resource sharing may be based on the relative priority of the two subscriptions. Increasing the number of page retransmissions may mitigate the number of missed calls that result from persistent contentions/collisions.

In the embodiment illustrated in FIG. 3, the two subscriptions have the same priority (i.e., a 1:1 resource allocation). FIG. 3 illustrates that for a slot cycle index (SCI) of 2, telescoping page retransmissions (e.g., 2 repeat pages at approximately 5 seconds and 15 seconds after the first page) may result in an effective average number of pages per call of 1.5. As an alternative to the pre-determined pattern of 1:1 resource allocation illustrated in FIG. 3, pseudo-random (uncorrelated) number sequences may be used to determine a pattern of resource sharing when the two subscriptions have the same priority. As another alternative, using an N-level pseudo-random number sequence and comparing random variables with threshold derived from a cumulative distribution function (CDF) of random variable to arbitrate signal processing resources between the two subscriptions may enable articulation of different levels of relative priorities between the two subscriptions. For example, a uniform random number generator that produces an output including random integers from 1 to 10 with an equal probability of each number (i.e., a 1/10 probability for each number) may be used. Utilizing the uniform random number generator that produces random integers from 1 to 10, the threshold may be set to a predetermined value of 7 such that the first subscription "wins" if the random number produced from the uniform random number generator is less than or equal to 7 (i.e., <=7) and the second subscription "wins" if the random number is greater than or equal to 8 (i.e., >=8). Accordingly, in cases of persistent collisions at each paging slot, the output of the uniform random number generator is compared to the threshold and an average pattern of 7:3 resource sharing is achieved. FIG. 3 illustrates that a predetermined pattern of resource sharing between two subscriptions that have the same priority may provide improved performance with respect to persistent contentions/collisions.

Referring to FIG. 4, a chart illustrates a particular embodiment of a method of arbitrating access to a shared signal processing resource of a dual-subscription device and is generally designated 400.

In the embodiment illustrated in FIG. 4, the two subscriptions have different priorities (e.g., a 2:1 resource allocation). FIG. 4 illustrates that for a slot cycle index (SCI) of 2, telescoping page retransmissions (e.g., 2 repeat pages at approximately 5 seconds and 15 seconds after the first page) may result in an effective average number of pages per call of 2 for the second subscription (i.e., the higher priority subscription in this example). With respect to the first subscription (i.e., the lower priority subscription in this example), the effective average number of pages per call is 1, with one third of calls expected to be missed. FIG. 4 illustrates that a pattern of resource sharing may be determined according to the relative priorities of the two subscriptions.

Figure 5:
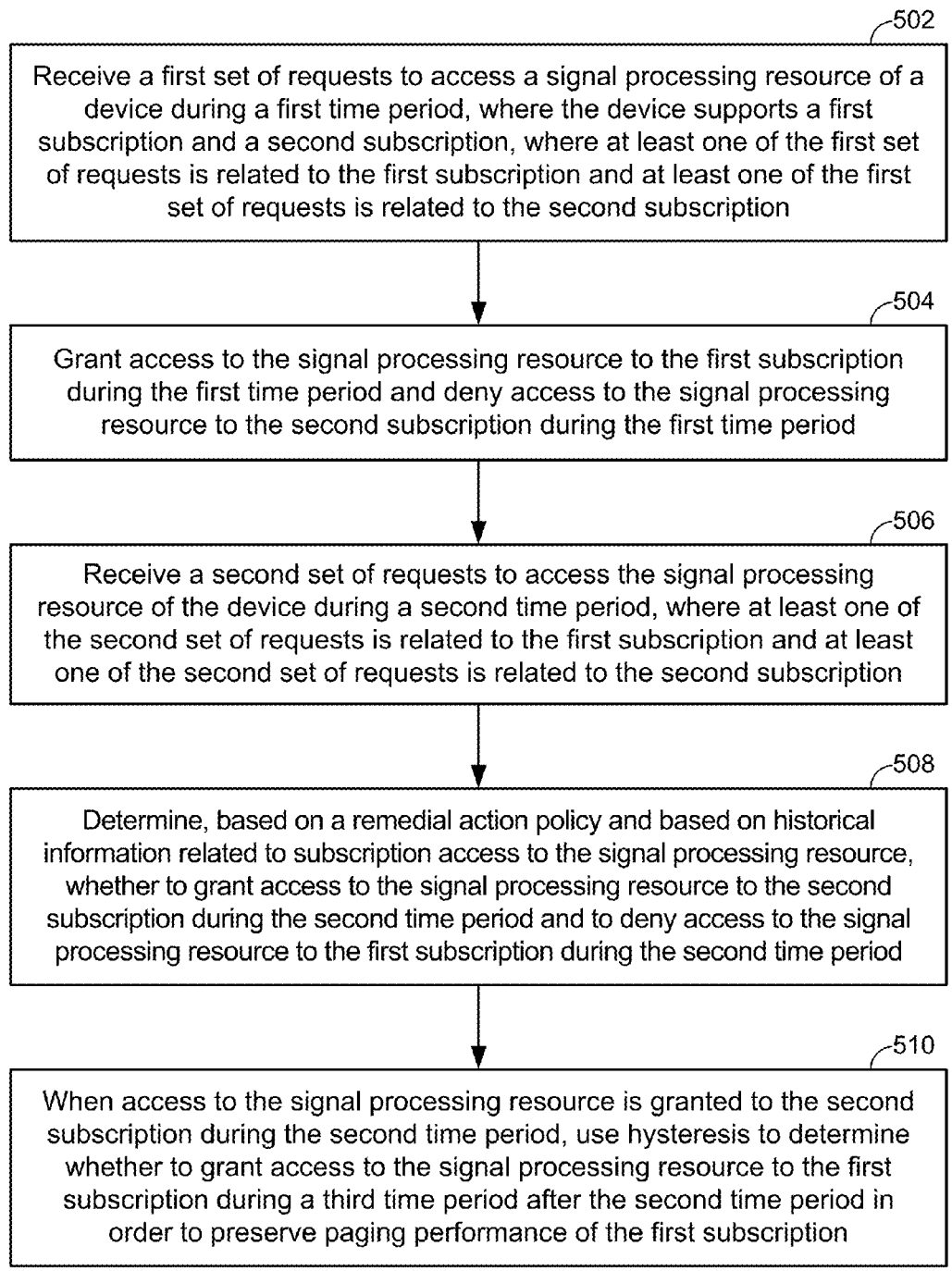
FIG. 5 is a flow chart of an illustrative embodiment of a method of arbitrating access to a shared signal processing resource of a dual-subscription device.

Referring to FIG. 5, a flow chart of a particular embodiment of a method of arbitrating access to a shared signal processing resource of a dual-subscription device is illustrated.

The method includes receiving a first set of requests to access a signal processing resource of a device that supports multiple subscriptions during a first time period, at 502. The device may include a first SIM associated with a first subscription and a second SIM associated with a second subscription. In a particular embodiment, the device includes the device 102 of FIG. 1 that includes the first SIM 110 (associated with a first subscription that may be provided by a first network 112) and the second SIM 116 (associated with a second subscription that may be provided by the second network 118). At least one request received during the first time period is related to the first subscription and at least one request is related to the second subscription.

The method includes granting access to the signal processing resource to the first subscription during the first time period and denying access to the signal processing resource to the second subscription during the first time period, at 504. For example, the controller 120 of FIG. 1 may grant access to the signal processing resource 106 to the first subscription and deny access to the signal processing resource 106 to the second subscription during the first time period.

The method includes receiving a second set of requests to access the signal processing resource of the device during a second time period, at 506. At least one request received during the second time period is related to the first subscription and at least one request is related to the second subscription. As an illustrative example, during the second time period, the controller 120 of FIG. 1 may receive a request to access the signal processing resource 106 (e.g., an RF resource) in order to receive the incoming page 122 from the first network 112 and another request to access the signal processing resource 106 in order to receive the incoming page 124 from the second network 118.

The method includes determining, based on a remedial action policy and based on historical information related to subscription access to the signal processing resource, whether to grant access to the signal processing resource to the second subscription and to deny access to signal processing resource to the first subscription during the second time period, at 508. For example, the controller 120 of FIG. 1 may determine whether to grant access to the signal processing resource 106 to the second subscription in order to receive the incoming page 124 from the second network 118. The determination may be based on the remedial action policy 126 and the historical information 128.

When access to the signal processing resource is granted to the second subscription during the second time period, at 508, the method includes using hysteresis to determine whether to grant access to the first subscription during a third time period that is after the second time period, at 510. Granting access to the first subscription during the third time period may preserve paging performance of the first subscription. For example, the controller 120 of FIG. 1 may use hysteresis to determine whether to grant access to the signal processing resource 106 to the first subscription during a third time period in order to preserve paging performance of the first subscription.

FIG. 5 illustrates that application of a remedial action policy and use of historical information related to subscription access to a signal processing resource may improve the performance of a subscription that lost an initial contention for the signal processing resource. That is, one or more remedial actions may be taken in order to provide a more similar user experience and call performance for the two subscriptions.

Figure 6:
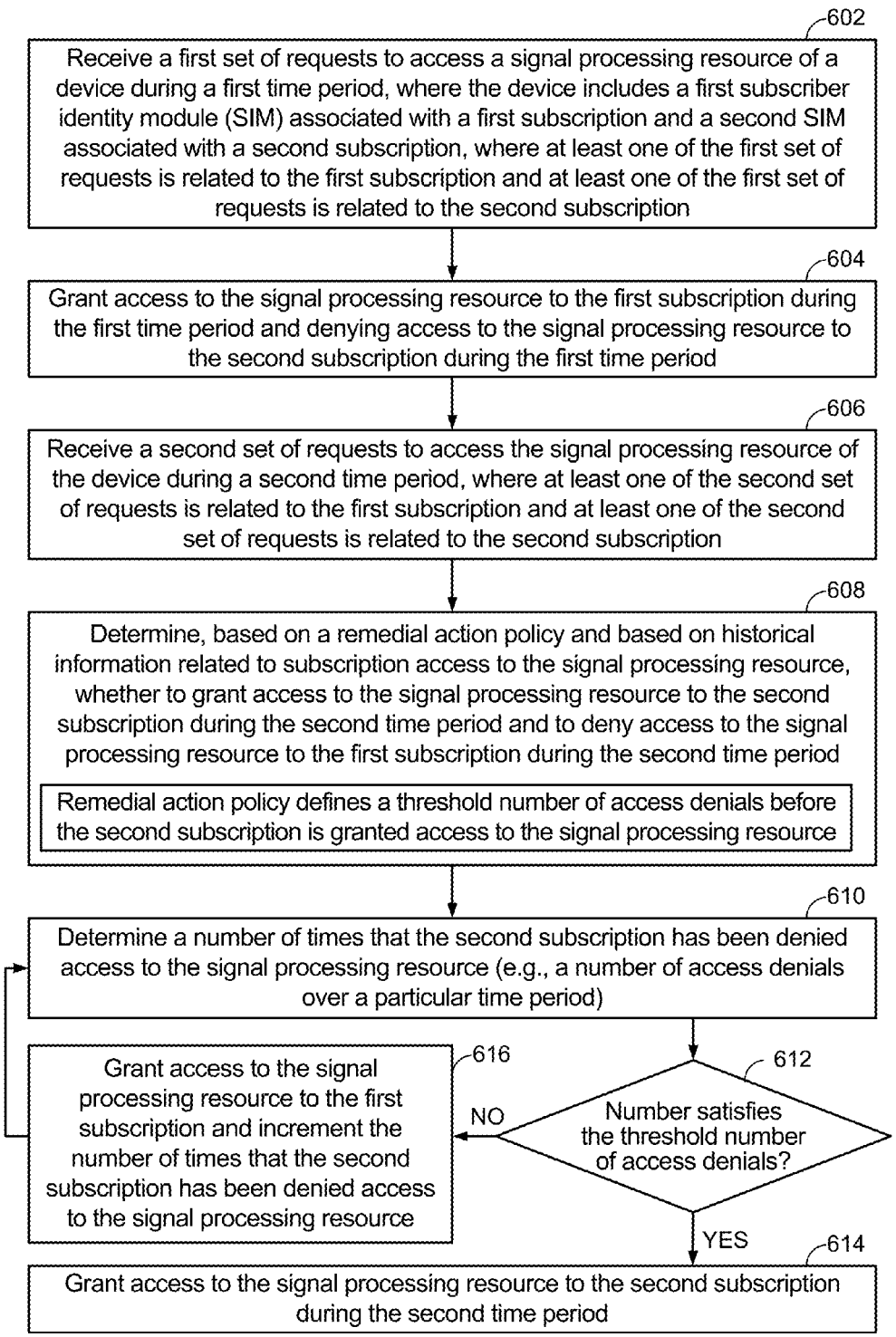
FIG. 6 is a flow chart of an illustrative embodiment of a method of performing a remedial action in response to one subscription being denied access to a shared signal processing resource of a dual-subscription device.

Referring to FIG. 6, a flow chart of a particular embodiment of a method of performing a remedial action in response to one subscription being denied access to a shared signal processing resource of a dual-subscription device is illustrated.

The method includes receiving a first set of requests to access a signal processing resource of a device that supports multiple subscriptions during a first time period, at 602. The device may include a first SIM associated with a first subscription and a second SIM associated with a second subscription. At least one request received during the first time period is related to the first subscription and at least one request is related to the second subscription. The method includes granting access to the signal processing resource to the first subscription during the first time period and denying access to the signal processing resource to the second subscription during the first time period, at 604. For example, the device may include the device 102 of FIG. 1, and the controller 120 may grant access to the signal processing resource 106 to the first subscription and deny access to the signal processing resource 106 to the second subscription during the first time period.

The method includes receiving a second set of requests to access the signal processing resource of the device during a second time period, at 606. At least one request received during the second time period is related to the first subscription and at least one request is related to the second subscription. The method includes determining, based on a remedial action policy and based on historical information related to subscription access to the signal processing resource, whether to grant access to the signal processing resource to the second subscription and to deny access to signal processing resource to the first subscription during the second time period, at 608.

In the embodiment illustrated in FIG. 6, the remedial action policy defines a threshold number of access denials before the second subscription is granted access to the signal processing resource. In this case, the method may include determining a number of times that the second subscription has been denied access to the signal processing resource, at 610. In one embodiment, the number of times that the second subscription has been denied access to the signal processing resource represents a number of access denials over a particular time period. The method includes determining whether the number of access denials satisfies a threshold number of access denials, at 612. When the number satisfies the threshold number of access denials, the second subscription is granted access to the signal processing resource during the second time period, at 614. Otherwise, when the number does not satisfy the threshold number of access denials, the first subscription is granted access to the signal processing resource and the number of times the second subscription has been denied access to the signal processing resource is incremented, at 616. After 616, the method may return to 610 to arbitrate access to the signal processing resource during a subsequent time period.

As an illustrative example, the controller 120 of FIG. 1 may receive a request to access the signal processing resource 106 (e.g., an RF resource) during the second time period in order to receive the incoming page 122 from the first network 112 and another request to access the signal processing resource 106 in order to receive the incoming page 124 from the second network 118. The controller 120 may determine the number of times that the second subscription has been denied access to the signal processing resource 106 based on the second subscription access denial information 132. The number of times that the second subscription has been denied access may be a number of access denials over a particular period of time.

The controller 120 may compare the number of access denials to the threshold number of access denials 134 of the remedial action policy 126. When the number of access denials satisfies the threshold number of access denials 134, the controller 120 may grant access to the signal processing resource 106 to the second subscription during the second time period. As such, the incoming page 124 from the second network 118 may be received, and the incoming page 122 from the first network 112 may not be received. When the number of access denials does not satisfy the threshold number of access denials 134, the controller 120 may grant access to the signal processing resource 106 to the first subscription during the second time period and increment the number of access denials associated with the second subscription. As such, the incoming page 122 from the first network 112 may be received, and the incoming page 124 from the second network 118 may not be received. When access to the signal processing resource is granted to the second subscription during the second time period, at 614, hysteresis may be used to determine whether to grant access to the first subscription during a third time period that is after the second time period. Granting access to the first subscription during the third time period may preserve paging performance of the first subscription.

FIG. 6 illustrates that application of a remedial action policy and use of historical information related to subscription access to a signal processing resource may improve the performance of a subscription that lost an initial contention. For example, the remedial action policy may define a threshold number of access denials before the subscription is granted access to the signal processing resource. When the number of access denials satisfies the threshold number of access denials, access to the signal processing resource may be granted to the subscription.

Figure 7:
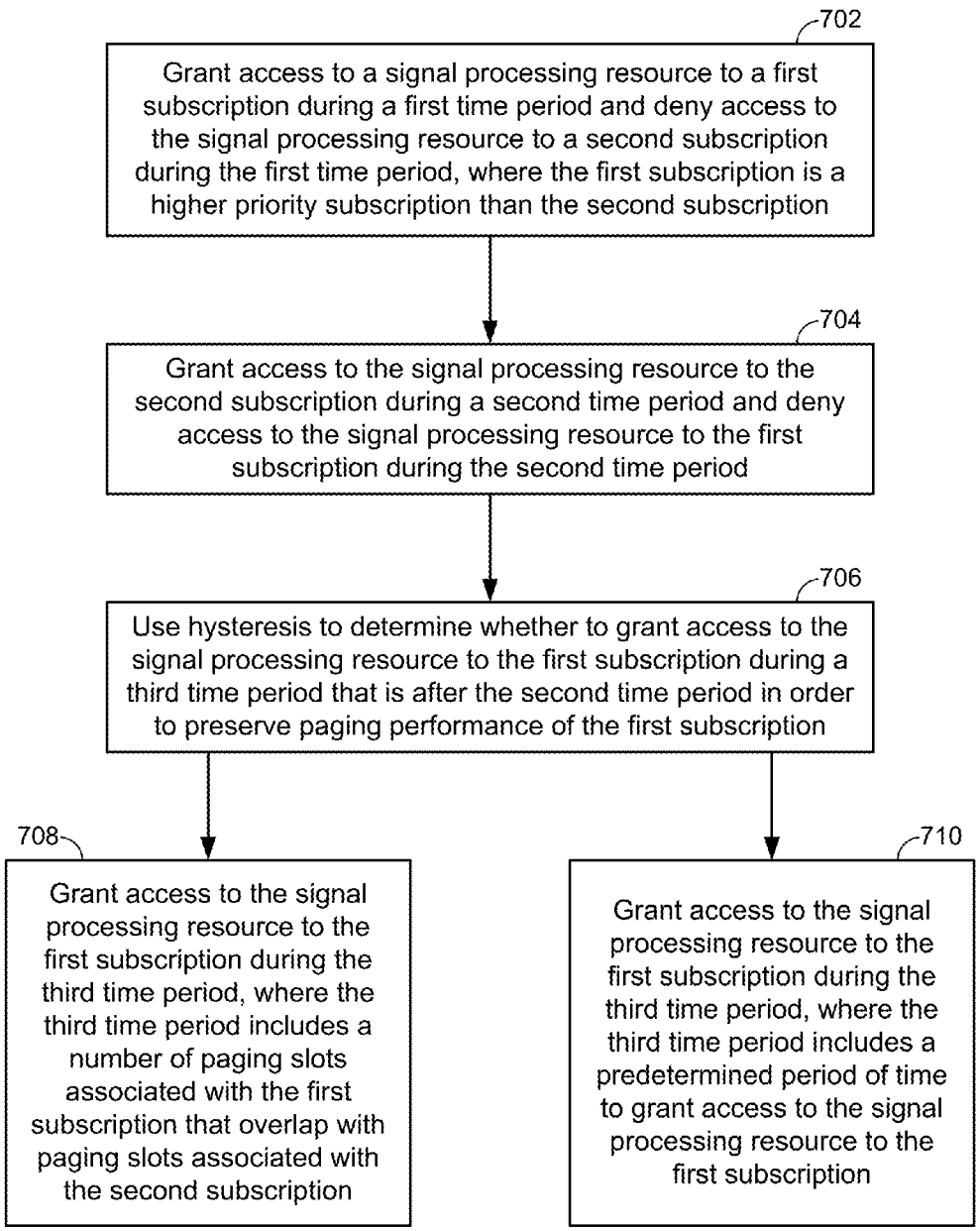
FIG. 7 is a flow chart of an illustrative embodiment of a method of using hysteresis to preserve paging performance of a higher priority subscription of a dual-subscription device.

Referring to FIG. 7, a flow chart of a particular embodiment of a method of using hysteresis to preserve paging performance of a higher priority subscription of a dual-subscription device is illustrated.

The method includes granting access to a signal processing resource to a first subscription during a first time period and denying access to the signal processing resource to a second subscription during the first time period, at 702. The first subscription may be a higher priority subscription than the second subscription. For example, the device may include the device 102 of FIG. 1, and the controller 120 may grant access to the signal processing resource 106 to the first subscription (e.g., the higher priority subscription) and deny access to the signal processing resource 106 to the second subscription (e.g., the lower priority subscription) during the first time period.

The method includes granting access to the signal processing resource to the second subscription (e.g., the lower priority subscription) during a second time period and denying access to the first subscription (e.g., the higher priority subscription) during the second time period, at 704. For example, the controller 120 of FIG. 1 may receive a request to access the signal processing resource 106 (e.g., an RF resource) during the second time period in order to receive the incoming page 122 from the first network 112 and another request to access the signal processing resource 106 in order to receive the incoming page 124 from the second network 118. The controller 120 may determine, based on the remedial action policy 126 and the historical information 128, to grant access to the signal processing resource 106 to the second subscription during the second time period. As such, the incoming page 124 from the second network 118 may be received, and the incoming page 122 from the first network 112 may not be received.

The method may include using hysteresis to determine whether to grant access to the signal processing resource to the first subscription during a third time period that is after the second time period in order to preserve paging performance of the first subscription, at 706. For example, the first subscription access denial information 130 of FIG. 1 may be used to determine whether paging performance of the first subscription (e.g., the higher priority subscription) is unsatisfactory. When the paging performance is determined to be unsatisfactory, access to the signal processing resource 106 may be granted to the first subscription during the third time period.

In one embodiment, the method includes granting access to the signal processing resource to the first subscription during the third time period, where the third time period includes paging slots associated with the first subscription that overlap with paging slots associated with the second subscription, at 708. For example, the controller 120 of FIG. 1 may grant access to the signal processing resource 106 to monitor the next N paging slots from the first network 112 that overlap with paging slots from the second network 118 in order to preserve paging performance of the first subscription (e.g., the higher priority subscription).

In another embodiment, the method includes granting access to the signal processing resource to the first subscription during the third time period, where the third time period includes a predetermined period of time to grant access to the signal processing resource to the first subscription, at 710. For example, the controller 120 of FIG. 1 may grant access to the signal processing resource 106 to monitor paging slots from the first network 112 during the predetermined period of time in order to preserve paging performance of the first subscription (e.g., the higher priority subscription).

FIG. 7 illustrates how hysteresis may be used so that paging performance of a primary subscription is not degraded below an acceptable level as a result of a secondary subscription being granted access to the RF resources instead of the primary subscription.

Figure 8:
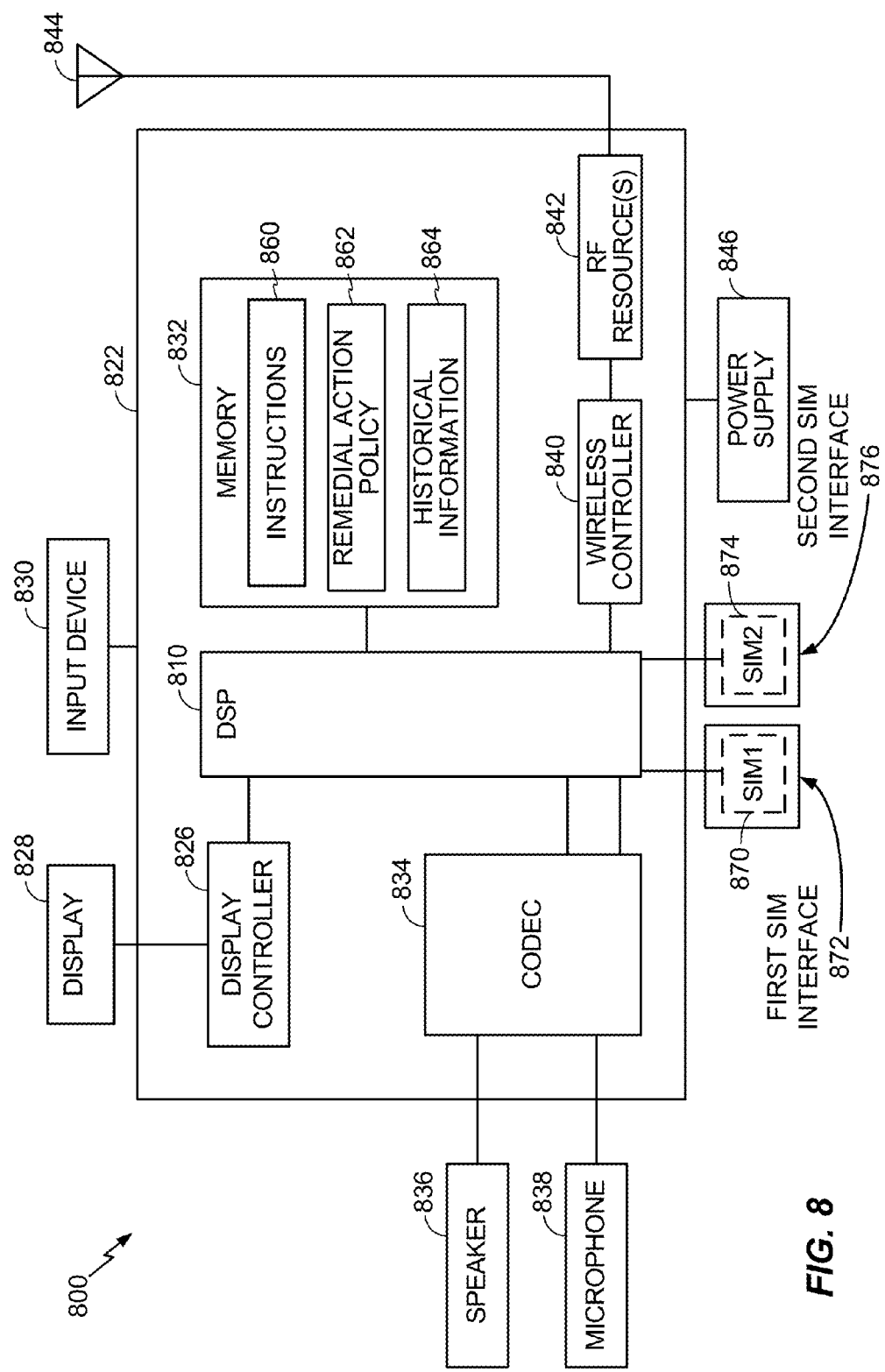
FIG. 8 is a block diagram of a portable electronic device that includes a controller to arbitrate access to a shared signal processing resource of a dual-subscription device.

Referring to FIG. 8, a block diagram of a particular illustrative embodiment of a portable electronic device is depicted and generally designated 800. In one embodiment, the portable electronic device 800 of FIG. 8 includes or is included within the device 102 of FIG. 1. Further, all or part of the methods described in FIGS. 2-7 may be performed at or by the portable electronic device 800 of FIG. 8. The portable electronic device 800 includes a processor, such as a digital signal processor (DSP) 810, coupled to a memory 832. The memory 832 is a computer readable tangible medium that stores instructions 860, at least one remedial action policy 862, and historical information 864. The instructions 860 may be executable by the DSP 810.

In the embodiment illustrated in FIG. 8, the portable electronic device 800 includes a first SIM interface 872 and a second SIM interface 876. The first SIM interface 872 may perform the function of receiving a first SIM 872 that is associated with a first subscription, and the second SIM interface 876 may perform the function of receiving a second SIM 874 that is associated with a second subscription. For example, at least one of the SIM interfaces 872, 876 may be a SIM card connector that includes a body having an accommodating space for a SIM card and multiple connected-through receptacles for receiving conducting terminals of a received SIM card. An electrical signaling contact with the SIM card can be made through the conducting terminals and the receptacles. An example interface may include a serial or parallel (e.g., 6-pin or S-pin) connection. Further, multiple SIM card sizes may be accommodated (e.g., full-size, mini-SIM, or micro-SIM). In alternative embodiments, the portable electronic device 800 may not include multiple SIM interfaces when multiple subscriptions are associated with a common UIM (e.g., a common SIM).

FIG. 8 also shows a display controller 826 that is coupled to the digital signal processor 810 and to a display 828. A coder/decoder (CODEC) 834 can also be coupled to the digital signal processor 810. A speaker 836 and a microphone 838 can be coupled to the CODEC 834. FIG. 8 also indicates that a wireless controller 840 can be coupled to the digital signal processor 810, to one or more signal processing resources (e.g., RF resources 842), and to a wireless antenna 844. In a particular embodiment, the wireless controller 840 may include or be included within the controller 120 of FIG. 1, and the RF resources 842 may correspond to the signal processing resource(s) 106 of the single Rx-Tx chain 104 of FIG. 1.

The wireless controller 840 may perform the function of receiving a first set of requests to access a signal processing resource (e.g., one or more RF resources 842) during a first time period, where at least one of the first set of requests is related to the first subscription and at least one of the first set of requests is related to the second subscription. The wireless controller 840 may further perform the function of granting access to the signal processing resource to the first subscription during the first time period and denying access to the signal processing resource to the second subscription during the first time period. The wireless controller 840 may further perform the function of receiving a second set of requests to access the signal processing resource during a second time period, where at least one of the second set of requests is related to the first subscription and at least one of the second set of requests is related to the second subscription. The wireless controller 840 may further perform the function of determining, based on the remedial action policy 862 and based on the historical information 864 related to subscription access to the signal processing resource, whether to grant access to the signal processing resource to the second subscription during the second time period and to deny access to the signal processing resource to the first subscription during the second time period. In a particular embodiment, the wireless controller 840 may further perform the function of granting access to the signal processing resource to the second subscription during the second time period. The wireless controller 840 may further perform the function of determining whether to grant access to the signal processing resource to the first subscription during a third time period that is after the second time period in order to preserve paging performance of the first subscription (e.g., using hysteresis). The wireless controller 840 may further perform the function of granting access to the signal processing resource during the third time period.

In a particular embodiment, the DSP 810, the display controller 826, the memory 832, the CODEC 834, the wireless controller 840, and the RF resources 842 are included in a system-in-package or system-on-chip device 822. In a particular embodiment, an input device 830 and a power supply 846 are coupled to the system-on-chip device 822. Moreover, in a particular embodiment, as illustrated in FIG. 8, the display 828, the input device 830, the speaker 836, the microphone 838, the wireless antenna 844, the power supply 846, the first SIM 870, the first SIM interface 872, the second SIM 874, and the second SIM interface 876 are external to the system-on-chip device 822. However, each of the display 828, the input device 830, the speaker 836, the microphone 838, the wireless antenna 844, the power supply 846, the first SIM 870, the first SIM interface 872, the second SIM 874, and the second SIM interface 876 can be coupled to a component of the system-on-chip device 822, such as an interface or a controller.

In a further embodiment, a framework for managing how a multi-SIM-multi-standby communication device (i.e., an MSMS communication device) that includes a plurality of SIMs manages periodic paging collisions among subscriptions to an arbitrary combination of multiple radio technologies may implement a retransmission remedial action for blocked subscriptions to reduce the paging performance bias among the multiple subscriptions operating on the MSMS communication device.

In the various embodiments, the MSMS communication device may assume or determine the paging retransmission schedule (the "retransmission interval") of a mobile switching center server ("MSC") when a subscription operating on the MSMS communication device (the "blocking subscription") blocks a paging message for another subscription (the "blocked subscription"). The MSC may schedule paging messages to be transmitted to a subscription on the MSMS communication device attempting to perform discontinuous reception ("DRX"). If the subscription does not respond to the page, the MSC may schedule a retransmission of the paging message (a "repeated page") during a future retransmission interval. During this retransmission interval, the MSMS communication device may increase the priority of the blocked subscription to increase the likelihood or to ensure that the blocked subscription receives the repeated page in the event that the blocked subscription is involved in another paging collision during the retransmission interval. By increasing the block subscription's priority during the retransmission interval, the MSMS communication device may improve the overall performance of the blocked subscription. The blocked subscription's priority may return to normal after the retransmission interval concludes.

In an embodiment, a blocked subscription may be blocked more than once, and the MSC may retransmit a repeated page during a separate retransmission interval for each blocked page. In a further embodiment, the retransmission intervals may overlap. The MSMS communication device may continue to keep the blocked subscription's priority heightened throughout the overlapping retransmission intervals. In other words, the blocked subscription's priority will be consistently heightened whenever one or more retransmission intervals are occurring.

In another embodiment, the MSMS communication device may increase the blocked subscription's priority based on the number of overlapping retransmission intervals occurring at a given time. For example, the MSMS communication device may assign each subscription a base or default priority level of "0." The MSMS communication device may then increase a blocked subscription's priority by "1" at the beginning of each retransmission interval. For instance, if a subscription has two pages blocked, resulting in two, overlapping retransmission intervals, the MSMS communication device may increase the blocked subscription's priority to "1" at the beginning of the first retransmission interval and may also increase the blocked subscription's priority from "1" to "2" at the beginning of the second retransmission interval. In another embodiment, as each retransmission interval ends, the MSMS communication device may reduce the blocked subscription's priority accordingly. Thus, when the earlier of the two retransmission intervals ends in the example above, the MSMS communication device may reduce the blocked subscription's priority to "1." When the second retransmission interval ends, the MSMS communication device may reduce the blocked subscription back to "0." By having multiple priority levels, the MSMS communication device may ensure that a subscription that has been repeatedly blocked within a short period of time will have a higher priority during subsequent retransmission intervals, thus increasing the likelihood that the subscription will prevail if that subscription is involved in a paging collision during a retransmission interval.

Figure 9:
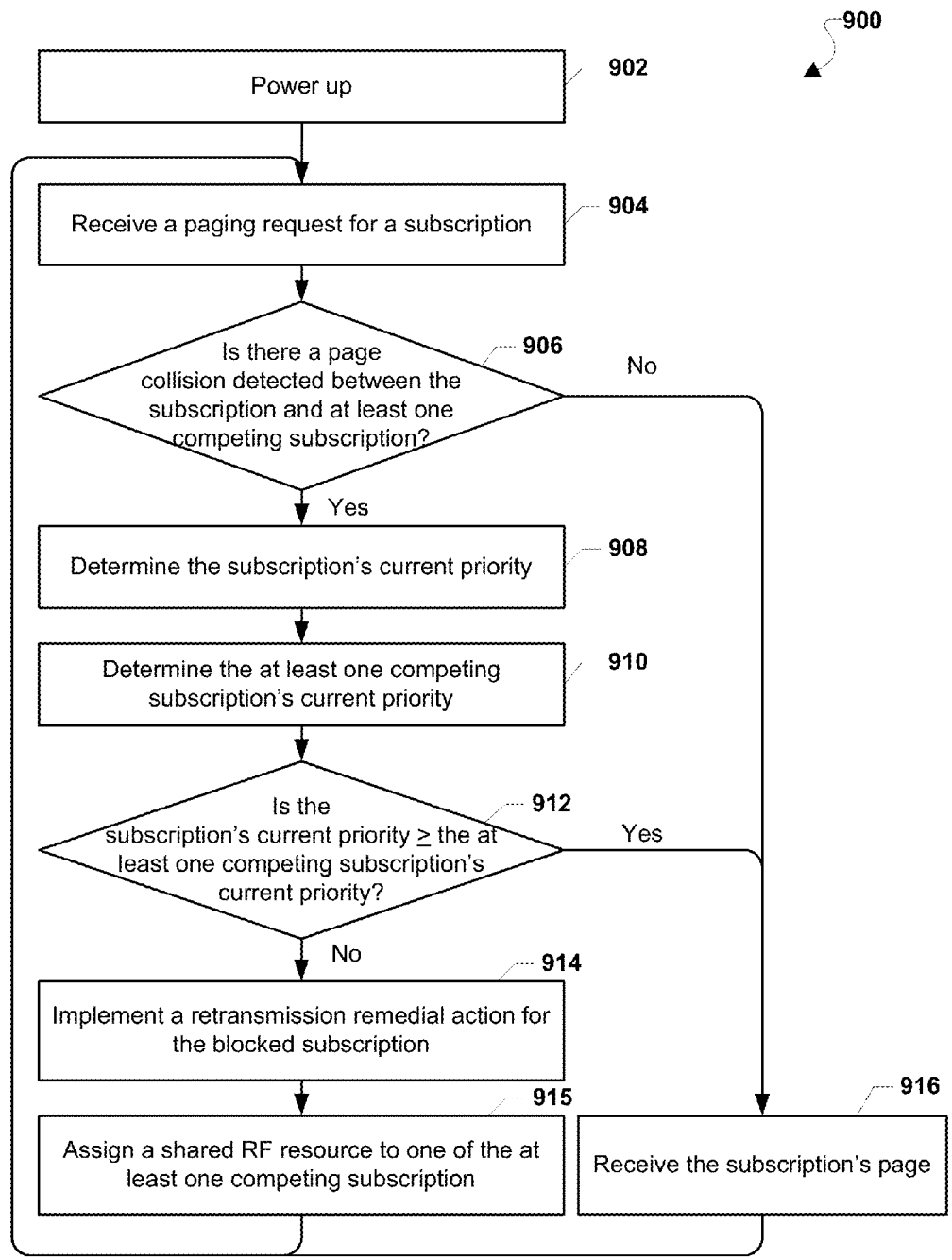
FIG. 9 is a process flow diagram of an embodiment method for implementing a retransmission remedial action for a blocked subscription.

FIG. 9 illustrates an embodiment method 900 for implementing a retransmission remedial action for a blocked subscription in an MSMS communication device. The MSMS communication device may power up in block 902.

In block 904, the MSMS communication device may receive a paging request for a subscription. The recipient subscription may be any one of multiple subscriptions currently operating on the MSMS communication device.

The MSMS communication device may determine whether a page collision detected between the subscription and at least one competing subscription is detected in determination block 906. As discussed above, a page collision may occur when two or more subscriptions have overlapping page sessions or, generally, when two or more subscriptions attempt to access a shared RF resource simultaneously. Thus, the MSMS communication device may detect a paging collision involving the subscription and at least one competing subscription attempting to utilize the shared RF resource simultaneously. If there is no collision detected (i.e., determination block 906="No"), the MSMS communication device may receive the subscription's page in block 916. The subscription may complete paging communications with its access network after receiving its page. This process may continue in a loop as the MSMS communication device may continue receiving a paging request for the subscription in block 904.

However, if the MSMS communication device detects that a page collision is occurring (i.e., determination block 906="Yes"), the MSMS communication device may begin performing one of various page collision arbitration strategies. For example, in block 908, the MSMS communication device may determine the subscription's current priority. In an embodiment, the MSMS communication device may maintain a current priority level for each subscription operating on the MSMS communication device because the subscriptions' priorities may change over time. Managing the current priority levels for the subscriptions is described below in further detail with reference to FIGS. 12 and 13. Similarly, the MSMS communication device may determine the at least one competing subscription's current priority in block 910.

In determination block 912, the MSMS communication device may determine whether the subscription's current priority is greater than or equal to the at least one competing subscription's current priority. If the subscription's current priority is greater than or equal to the at least one competing subscription's current priority (i.e., determination block 912="Yes"), the MSMS communication device may receive the subscription's page in block 916. The MSMS communication device may, therefore, allow the subscription to complete paging communications with its access network. This process may continue in a loop as the MSMS communication device may continue receiving a paging request for the subscription in block 904.

However, if the subscription's current priority is less than the priority of the at least one competing subscription (i.e., determination block 912="No"), the MSMS communication device may implement a retransmission remedial action for the subscription in block 914. Generally, the MSMS communication device may implement a remedial action by increasing the likelihood or ensuring that the blocked subscription will receive the blocked page during some future retransmission interval when the blocked page is retransmitted to the blocked subscription. Implementing a retransmission remedial action is further discussed below with reference to FIGS. 10-11.

The MSMS communication device may assign a shared RF resource to one of the at least one competing subscription in block 915. This process may continue in a loop as the MSMS communication device may continue receiving a paging request for the subscription in block 904.

While the above description discusses implementing a retransmission remedial action for one blocked subscription, it is anticipated that the MSMS communication device may implement retransmission remedial actions for each blocked subscription. In other words, the MSMS communication device may perform the various actions of method 900 for one or more blocked subscriptions.

Figure 10:
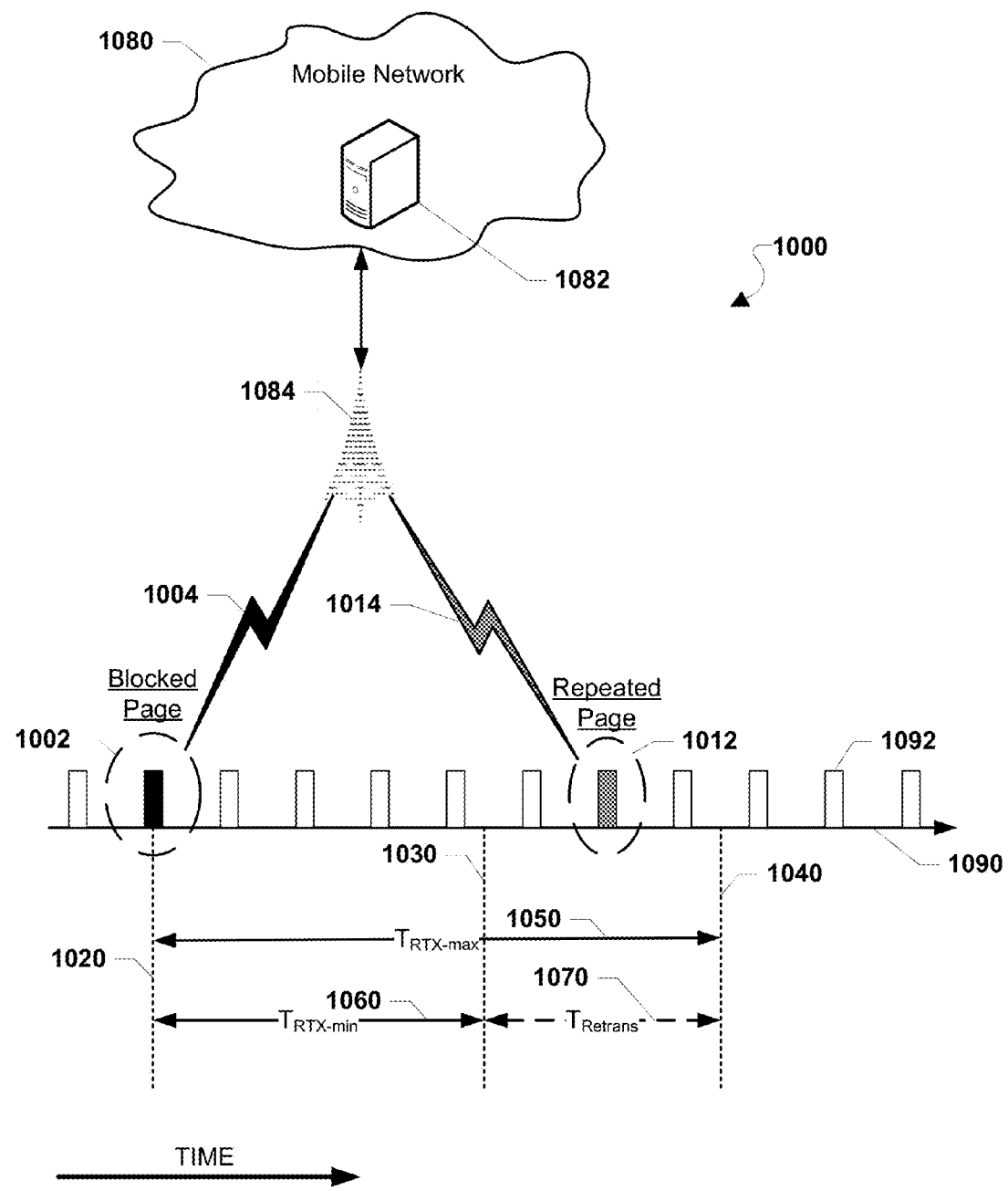
FIG. 10 is a timeline diagram illustrating timing issues related to blocked transmissions.

FIG. 10 illustrates a time-line 1000 of a retransmission of a blocked paging message. In various embodiments, a MSC 1082 in a mobile network 1080 may schedule periodic transmissions of paging messages 1092 from a base station 1084 to a subscription 1090 operating on a MSMS communication device. As described above with reference to FIG. 2, occasionally, a subscription 1090's paging message may be blocked (i.e., a blocked page 1002) because the MSMS communication device has given a shared RF resource to a competing subscription instead of the subscription 1090.

Typically, the base station 1084 expects to receive an acknowledgement from the subscription 1090 after the subscription 1090 receives a paging message 1092. When the base station 1084 does not receive such an acknowledgement because, for example, the subscription 1090 never received the transmission 1004 that includes the blocked page 1002, the MSC 1082 may schedule a retransmission 1014 of the blocked page 1002 (i.e., a repeated page 1012) within a certain time period in the future. Because of variations in the way in which the mobile network 1080 schedules retransmissions, the MSMS communication device may be unable to predict the exact time of retransmission 1014 of the repeated page 1012.

However, in the various embodiments, the MSMS communication device may predict a certain time period in which a retransmission 1014 of the repeated page 1012 will occur (i.e., the retransmission interval 1070 or $T_{Retrans}$). In these embodiments, the MSMS communication device may be preconfigured to know the earliest retransmission time 1030 and the latest retransmission time 1040 in which a retransmission 1014 of the repeated page 1012 may occur after the subscription 1090's page was blocked (i.e., the time of blocking 1020).

In an embodiment, the MSMS communication device may calculate the retransmission interval 1070 based on the time of blocking 1020, the earliest retransmission time 1030, and the latest retransmission time 1040. The MSMS communication device may determine the maximum retransmission interval 1050 (i.e., $T_{RTX-max}$) by determining the duration from the time of blocking 1020 to the latest retransmission time 1040. The MSMS communication device may also determine the minimum retransmission interval 1060 (i.e., $T_{RTX-min}$) by determining the duration from the time of blocking 1020 to the earliest retransmission time 1030. The MSMS communication device may subtract the minimum retransmission interval 1060 from the maximum retransmission interval 1050 to yield the retransmission interval 1070. In other words, $T_{Retrans} = T_{RTX-max} - T_{RTX-min}$.

Thus, by determining the retransmission interval 1070, the MSMS communication device may anticipate approximately when the subscription 1090 may receive a repeated page 1012 and may, accordingly, increase the likelihood or ensure that the subscription 1090 will successfully receive the repeated page 1012 during the retransmission interval 1070 as described with reference to FIGS. 11 and 12.

Figure 11:
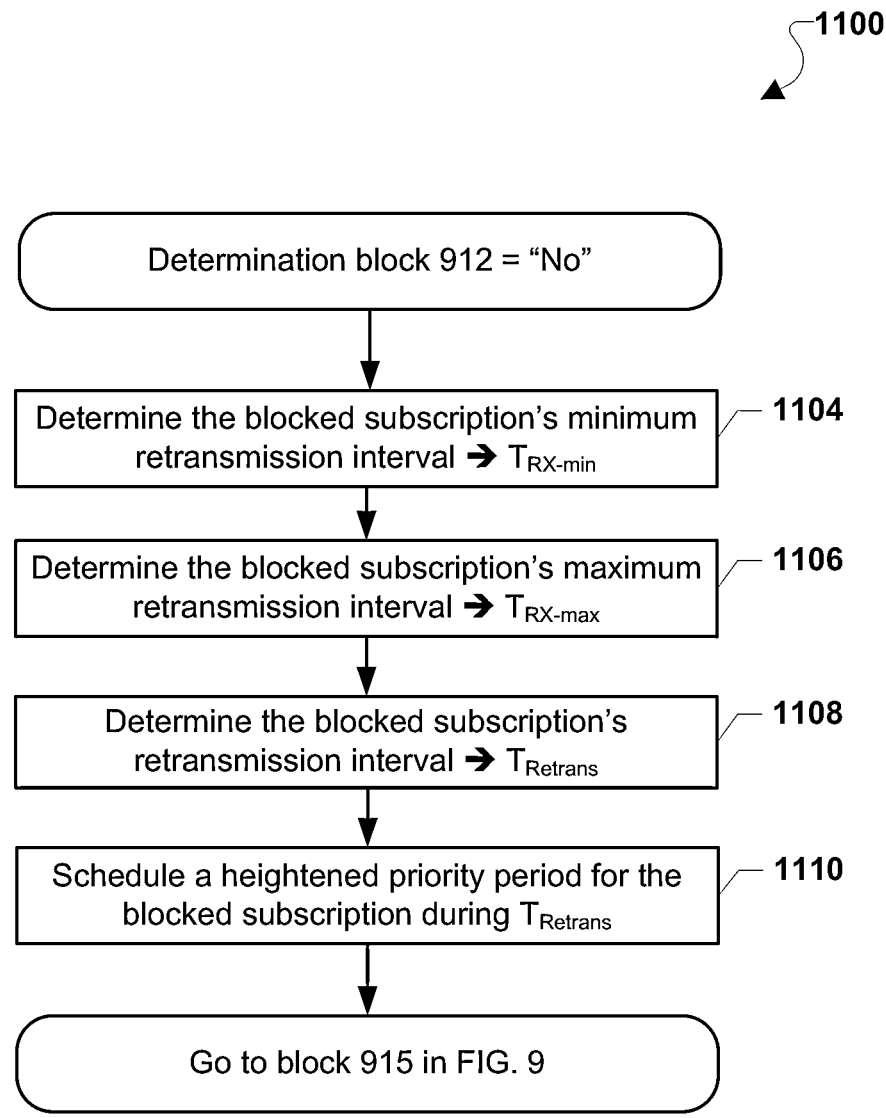
FIG. 11 is a process flow diagram of an embodiment method for determining a timing for a retransmission remedial action for a blocked subscription.

FIG. 11 illustrates an embodiment method 1100 for implementing in a MSMS communication device a heightened priority for a blocked subscription during the blocked subscription's retransmission intervals. The operations of method 1100 implement an embodiment of the operations of block 914 of method 900 described above with reference to FIG. 9. In the various embodiments, the MSMS communication device may be preconfigured with information about the retransmission schedule of a MSC associated with a blocked subscription. The MSMS communication device may also determine a MSC's retransmission schedule by determining an expected time range of retransmissions based on monitoring for expected repeated pages for a particular blocked subscription over time.

The MSMS communication device may begin performing method 1100 when a subscription has a page blocked (i.e., determination block 912="No") as described above with reference to FIG. 9.

In block 1104, the MSMS communication device may determine the blocked subscription's minimum retransmission interval (i.e., $T_{RX-min}$). As described above with reference to FIG. 10, the minimum retransmission interval may be a duration of time from the time in which the blocked subscription's page was blocked to the earliest time in which a page may be retransmitted. In block 1106, the MSMS communication device may also determine the blocked subscription's maximum retransmission interval (i.e., $T_{RX-min}$). As also described above, the maximum retransmission interval may be the period of time from when the blocked subscription's page was blocked to when the latest time in which a repeated page may be retransmitted.

In block 1108, the MSMS communication device may determine the blocked subscription's retransmission interval (i.e., $T_{Retrans}$). In an embodiment, the MSMS communication device may calculate the retransmission interval by subtracting the minimum retransmission interval from the maximum retransmission interval (i.e., $T_{Retrans} = T_{RX-max} - T_{RX-min}$).

In block 1110, the MSMS communication device may also schedule a heightened priority period for the blocked subscription during the retransmission interval. In an embodiment, the blocked subscription's priority may be heightened either to ensure that the blocked subscription receives the retransmitted page or to increase the likelihood that the blocked subscription will prevail if there is a page collision during the retransmission interval. Managing the blocked subscription's heightened priority periods is discussed in further detail with reference to FIGS. 12 and 13.

The MSMS communication device may continue performing by assigning the RF resource to one of the at least one competing subscription that prevailed over the blocked subscription in the paging collision arbitration as described above in block 915 with reference to FIG. 9.

Figure 12:
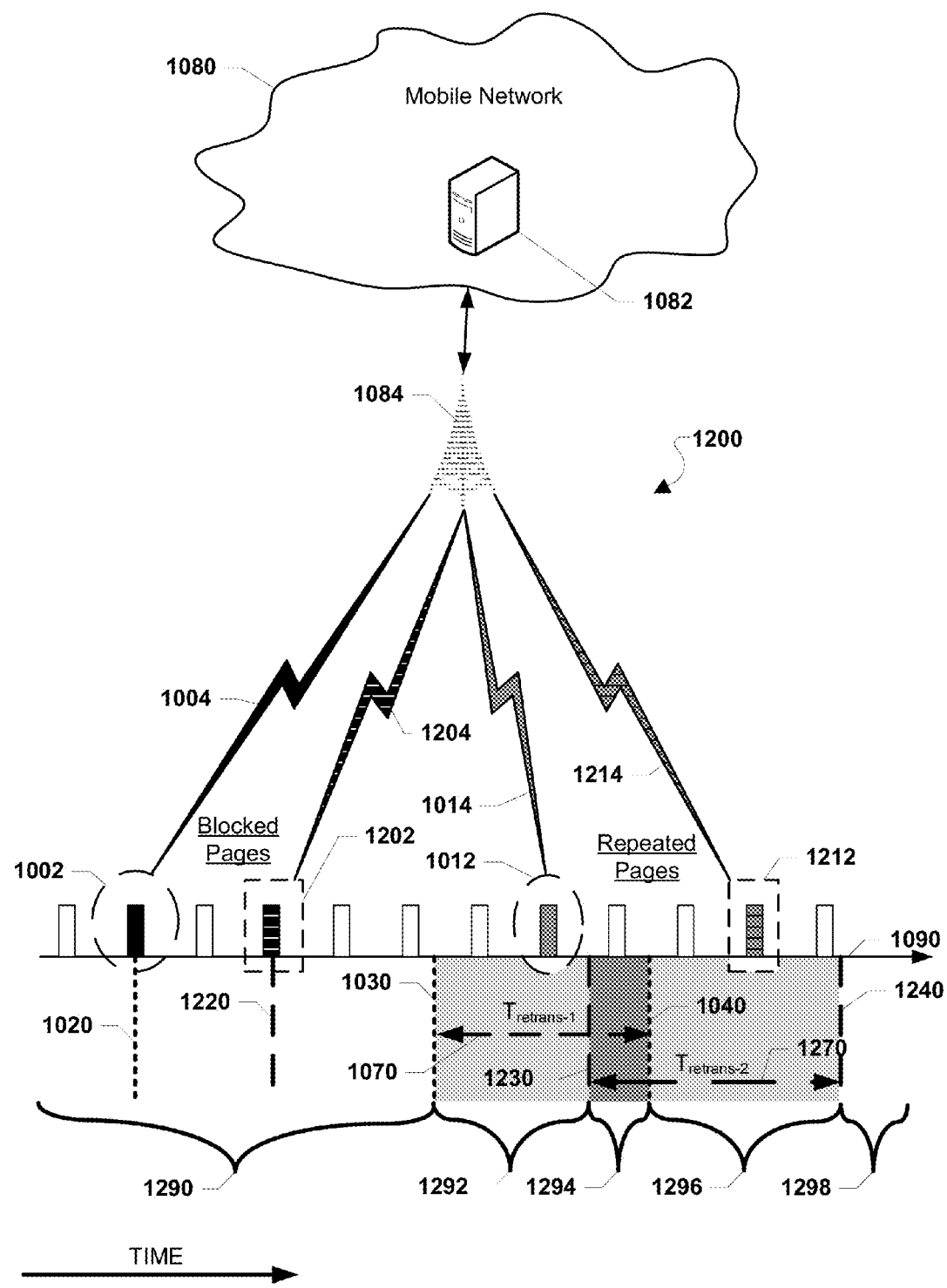
FIG. 12 is a timeline diagram illustrating timing issues related to blocked transmissions.

FIG. 12 is a time-line diagram 1200 illustrating changes in a subscription 1090's priority during retransmission intervals. As discussed above with reference to FIG. 11, a MSMS communication device may schedule a subscription to receive heightened priority during a retransmission interval. For example, the MSMS communication device may determine a first retransmission interval 1070 when a subscription 1090 has a blocked page 1002 at time 1020. Because the retransmission interval 1070 is later in time, the MSMS communication device may not initially increase the subscription 1090's priority. Thus, as illustrated in FIG. 12, the subscription may have a default priority level (e.g., zero) before and until the beginning of the retransmission interval 1070 (i.e., priority period 1290).

At the start of the retransmission interval 1070 (i.e., the earliest retransmission time 1030), the MSMS communication device may raise the subscription 1090's priority. The MSMS communication device may also maintain the subscription 1090's higher priority throughout the retransmission interval 1070. For example, the MSMS communication device may raise the subscription 1090's priority level from zero to one. Thus, as illustrated in FIG. 12, the subscription 1090's priority may have a value of at least one during heightened priority periods 1292, 1294, which occur during the first retransmission interval 1070.

In a further embodiment, the MSMS communication device may implement an additional retransmission remedial action when the subscription 1090 has a subsequently blocked page (e.g., a second blocked page 1202) at time 1220 that occurs after the first blocked page 1002. For example, a base station 1084 may send a second page transmission 1204 to the subscription 1090 after the first page transmission 1004, and another subscription may block the second page transmission 1204. Because the subscription 1090 did not receive the second blocked page 1202 and thus did not send an acknowledgement to the base station 140, the MSC 1082 in the subscription 1090's mobile network 1080 may schedule a retransmission 1214 of a second repeated page 1212.

In an embodiment, in response to a second blocked page 1202, the MSMS communication device may calculate a second retransmission interval 1270 as described above with reference to FIG. 10 based on the second blocked page 1202's time of blocking 1220, a second earliest retransmission time 1230, and a second latest retransmission time 1240. The MSMS communication device may also heighten the subscription 1090's priority during the second retransmission interval 1270. For example, the MSMS communication device may raise the subscription 1090's priority by one during the second retransmission interval 1270.

In some instances, a retransmission interval may overlap in time with one or more other retransmission intervals. In an embodiment, the overlapping retransmission intervals 1070, 1270 may have a cumulative effect on the subscription 1090's priority. In other words, the priority of the subscription 1090 may be based on a cumulative number of retransmission intervals that are currently occurring. For example, the MSMS communication device may increase the subscription 1090's priority from one (i.e., the heightened priority during the first retransmission interval 1070) to two because the two retransmission intervals 1070, 1270 occur at the same time.

Thus, in an embodiment, the subscription 1090's priority may evolve as presently described. During the period 1290 before the beginning of the first retransmission interval (i.e., the first earliest retransmission time 1030), the subscription 1090 may have a default or un-heightened priority level. During the period 1292 from the first earliest retransmission time 1030 until the beginning of the second retransmission interval (i.e., the second earliest retransmission time 1230), the subscription 1090's priority may be raised one level. During the period 1294 from the second earliest retransmission time 1230 until the end of the first retransmission interval 1070 (i.e., the first latest retransmission time 1040), the subscription 1090's priority may be raised an additional level (e.g., from level one to level two). During the period 1296 from after the end of the first retransmission interval 1070 until the end of the second retransmission interval 1270, the subscription 1090's priority may be reduced by one level because only one retransmission interval is occurring during this time. During the period 1298 after the end of the second retransmission interval 1270 (i.e., after the second latest retransmission time 1240), the subscription 1090's priority may be reduced by one level, thereby returning the subscription 1090 to a default or un-heightened priority level.

While not illustrated, it is anticipated that additional overlapping retransmission intervals may occur that may affect the priority level of the subscription 1090 as described in the above description.

Figure 13:
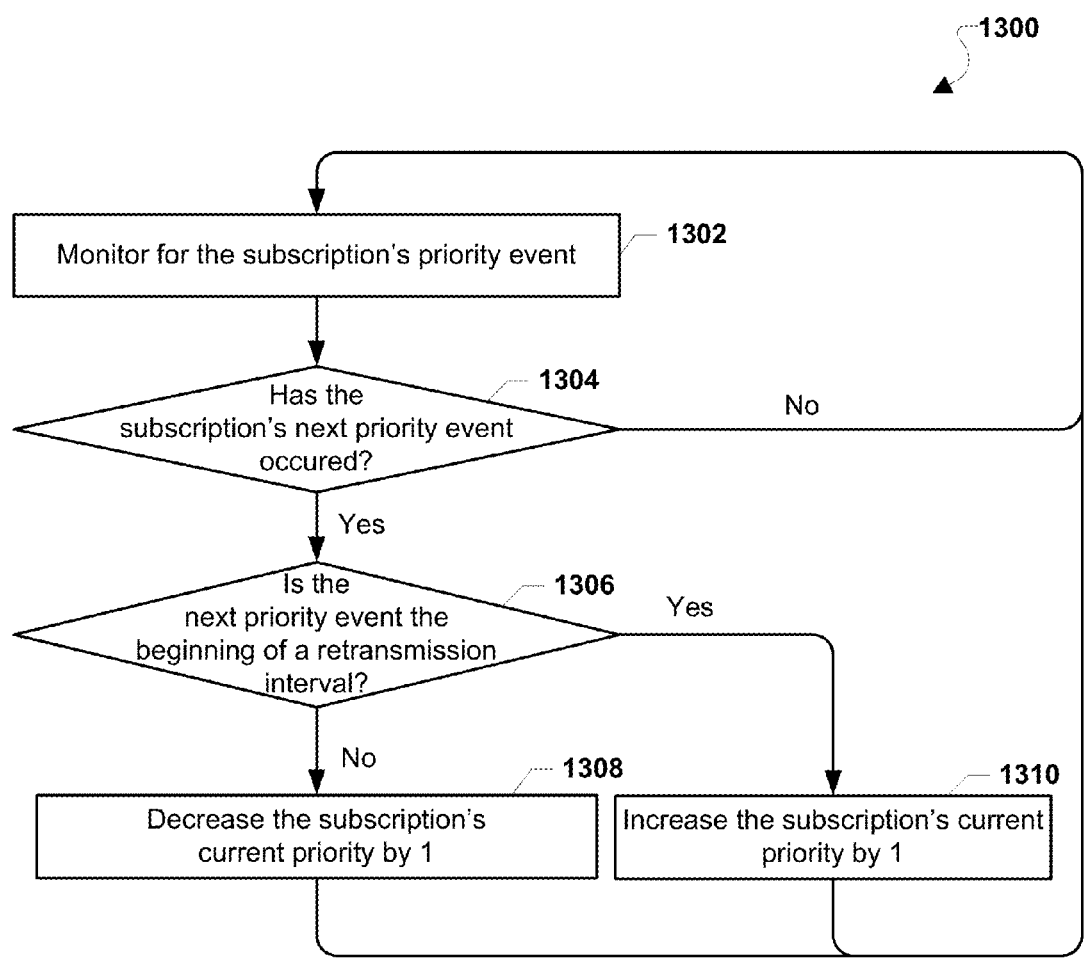
FIG. 13 is a process flow diagram of an embodiment method for determining a priority for performing retransmission remedial actions for a blocked subscription.

FIG. 13 illustrates an embodiment method 1300 that may be implemented in an MSMS communication device for managing a subscription's priority level. In the various embodiments, the MSMS communication device may raise or lower a subscription's current priority when a priority event occurs. The priority event may be the beginning or the end of a retransmission interval.

In block 1302, the MSMS communication device may monitor for a subscription's next priority event. For example, the MSMS communication device may determine whether the beginning or end of a retransmission interval has occurred. In determination block 1304, the MSMS communication device may determine whether the subscription's next priority event has occurred. For example, the MSMS communication device may determine whether a retransmission interval for the subscription has started or concluded. If the subscription's next priority event has not occurred (i.e., determination block 1304="No"), the MSMS communication device may continue monitoring for the subscription's next priority event in block 1302.

If the subscription's next priority event has occurred (i.e., determination block 1304="Yes"), the MSMS communication device may determine whether the next priority event is the beginning of a retransmission interval in determination block 1306. If the next priority event is the beginning of a retransmission interval (i.e., determination block 1306="Yes"), the MSMS communication device may increase the subscription's current priority by one in block 1308. The MSMS communication device may repeat the process by returning to the processes in block 1302.

However, if the next priority event is not the beginning of a retransmission interval (i.e., determination block 1306="No"), the MSMS communication device may decrease the subscription's current priority by one in block 1310. In this case, the priority event may be the end of the retransmission interval, thereby indicating that the subscription's priority must be reduced. The MSMS communication device may repeat the process by returning to the processes in block 1302.

While not shown in FIG. 13, in the various embodiments described above, the MSMS communication device may maintain a subscription's current priority level, for example, by storing the subscription's current priority value in memory and updating that value when a priority event occurs.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module (e.g., stored processor-executable software instructions) may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code (i.e., processor-executable instructions) on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method of implementing a retransmission remedial action for a blocked subscription operating on a multi-SIM-multi-standby communication device, comprising:
   receiving a paging message for a subscription;
   detecting a paging collision between the subscription and at least one competing subscription;
   determining a priority of the subscription;
   determining a priority of the at least one competing subscription;
   determining whether the priority of the subscription is greater than or equal to the priority of the at least one competing subscription;
   implementing the retransmission remedial action for the subscription in response to determining that the priority of the subscription is less than the priority of the at least one competing subscription;
   receiving the paging message for the subscription in response to determining that the priority of the subscription is greater than or equal to the priority of the at least one competing subscription;
monitoring for a next priority event for the subscription;
determining whether the next priority event has been reached;
determining whether the next priority event is the beginning of a retransmission interval in response to determining that the next priority event has been reached;
decreasing the priority of the subscription in response to determining that the next priority event is not the be beginning of a retransmission interval; and
increasing the priority of the subscription in response to determining that the next priority event is the beginning of a retransmission interval.

2. A method of implementing a retransmission remedial action for a blocked subscription operating on a multi-SIM-multi-standby communication device, comprising:
receiving a paging message for a subscription;
detecting a paging collision between the subscription and at least one competing subscription;
determining a priority of the subscription;
determining a priority of the at least one competing subscription;
determining whether the priority of the subscription is greater than or equal to the priority of the at least one competing subscription;
implementing the retransmission remedial action for the subscription in response to determining that the priority of the subscription is less than the priority of the at least one competing subscription, wherein implementing the retransmission remedial action for the subscription comprises:
determining a minimum retransmission interval for the subscription;
determining a maximum retransmission interval for the subscription;
determining a retransmission interval for the subscription, wherein determining the retransmission interval for the subscription comprises subtracting the minimum retransmission interval from the maximum retransmission interval; and
scheduling a heightened priority period for the subscription during the retransmission interval; and
receiving the paging message for the subscription in response to determining that the priority of the subscription is greater than or equal to the priority of the at least one competing subscription.

3. The method of claim 2, wherein
the retransmission interval overlaps with one or more other retransmission intervals resulting from other paging collisions; and
the priority of the subscription is based on a cumulative number of retransmission intervals.

4. A multi-SIM-multi-standby communication device, comprising:
means for receiving a paging message for a subscription;
means for detecting a paging collision between the subscription and at least one competing subscription;
means for determining a priority of the subscription;
means for determining a priority of the at least one competing subscription;
means for determining whether the priority of the subscription is greater than or equal to the priority of the at least one competing subscription;
means for implementing a retransmission remedial action for the subscription in response to determining that the priority of the subscription is less than the priority of the at least one competing subscription;
means for receiving the paging message for the subscription in response to determining that the priority of the subscription is greater than or equal to the priority of the at least one competing subscription;
means for monitoring for a next priority event for the subscription;
means for determining whether the next priority event has been reached;
means for determining whether the next priority event is the beginning of a retransmission interval in response to determining that the next priority event has been reached;
means for decreasing the priority of the subscription in response to determining that the next priority event is not the beginning of a retransmission interval; and
means for increasing the priority of the subscription in response to determining that the next priority event is the beginning of a retransmission interval.

5. A multi-SIM-multi-standby communication device, comprising:
means for receiving a paging message for a subscription;
means for detecting a paging collision between the subscription and at least one competing subscription;
means for determining a priority of the subscription;
means for determining a priority of the at least one competing subscription;
means for determining whether the priority of the subscription is greater than or equal to the priority of the at least one competing subscription;
means for implementing a retransmission remedial action for the subscription in response to determining that the priority of the subscription is less than the priority of the at least one competing subscription, wherein the means for implementing the retransmission remedial action for the subscription comprises:
means for determining a minimum retransmission interval for the subscription;
means for determining a maximum retransmission interval for the subscription;
means for determining a retransmission interval for the subscription, wherein the means for determining the retransmission interval for the subscription comprises means for subtracting the minimum retransmission interval from the maximum retransmission interval; and
means for scheduling a heightened priority period for the subscription during the retransmission interval; and
means for receiving the paging message for the subscription in response to determining that the priority of the subscription is greater than or equal to the priority of the at least one competing subscription.

6. The multi-SIM-multi-standby communication device of claim 5, wherein
the retransmission interval overlaps with one or more other retransmission intervals resulting from other paging collisions; and
the priority of the subscription is based on a cumulative number of retransmission intervals.

7. A multi-SIM-multi-standby communication device, comprising:
a processor configured with processor-executable instructions to perform operations comprising:
receiving a paging message for a subscription;

detecting a paging collision between the subscription and at least one competing subscription;
determining a priority of the subscription;
determining a priority of the at least one competing subscription;
determining whether the priority of the subscription is greater than or equal to the priority of the at least one competing subscription;
implementing a retransmission remedial action for the subscription in response to determining that the priority of the subscription is less than the priority of the at least one competing subscription;
receiving the paging message for the subscription in response to determining that the priority of the subscription is greater than or equal to the priority of the at least one competing subscription;
monitoring for a next priority event for the subscription;
determining whether the next priority event has been reached;
determining whether the next priority event is the beginning of a retransmission interval in response to determining that the next priority event has been reached;
decreasing the priority of the subscription in response to determining that the next priority event is not the beginning of a retransmission interval; and
increasing the priority of the subscription in response to determining that the next priority event is the beginning of a retransmission interval.

8. A multi-SIM-multi-standby communication device, comprising:
a processor configured with processor-executable instructions to perform operations comprising:
receiving a paging message for a subscription;
detecting a paging collision between the subscription and at least one competing subscription;
determining a priority of the subscription;
determining a priority of the at least one competing subscription;
determining whether the priority of the subscription is greater than or equal to the priority of the at least one competing subscription;
implementing a retransmission remedial action for the subscription in response to determining that the priority of the subscription is less than the priority of the at least one competing subscription, wherein implementing the retransmission remedial action for the subscription comprises:
determining a minimum retransmission interval for the subscription;
determining a maximum retransmission interval for the subscription;
determining a retransmission interval for the subscription, wherein determining the retransmission interval for the subscription comprises subtracting the minimum retransmission interval from the maximum retransmission interval; and
scheduling a heightened priority period for the subscription during the retransmission interval; and
receiving the paging message for the subscription in response to determining that the priority of the subscription is greater than or equal to the priority of the at least one competing subscription.

9. The multi-SIM-multi-standby communication device of claim 8, wherein the processor is configured with processor-executable instructions to perform operations such that:

the retransmission interval overlaps with one or more other retransmission intervals resulting from other paging collisions; and
the priority of the subscription is based on a cumulative number of retransmission intervals.

10. A non-transitory processor-readable storage medium having stored thereon processor-executable software instructions configured to cause a processor of a multi-SIM-multi-standby communication device to perform operations comprising:
receiving a paging message for a subscription;
detecting a paging collision between the subscription and at least one competing subscription;
determining a priority of the subscription;
determining a priority of the at least one competing subscription;
determining whether the priority of the subscription is greater than or equal to the priority of the at least one competing subscription;
implementing a retransmission remedial action for the subscription in response to determining that the priority of the subscription is less than the priority of the at least one competing subscription;
receiving the paging message for the subscription in response to determining that the priority of the subscription is greater than or equal to the priority of the at least one competing subscription:
monitoring for a next priority event for the subscription;
determining whether the next priority event has been reached;
determining whether the next priority event is the beginning of a retransmission interval in response to determining that the next priority event has been reached;
decreasing the priority of the subscription in response to determining that the next priority event is not the beginning of a retransmission interval; and
increasing the priority of the subscription in response to determining that the next priority event is the beginning of a retransmission interval.

11. A non-transitory processor-readable storage medium having stored thereon processor-executable software instructions configured to cause a processor of a multi-SIM-multi-standby communication device to perform operations comprising:
receiving a paging message for a subscription;
detecting a paging collision between the subscription and at least one competing subscription;
determining a priority of the subscription;
determining a priority of the at least one competing subscription;
determining whether the priority of the subscription is greater than or equal to the priority of the at least one competing subscription;
implementing a retransmission remedial action for the subscription in response to determining that the priority of the subscription is less than the priority of the at least one competing subscription, wherein implementing the retransmission remedial action for the subscription comprises:
determining a minimum retransmission interval for the subscription;
determining a maximum retransmission interval for the subscription;
determining a retransmission interval for the subscription, wherein determining the retransmission interval for the subscription comprises subtracting the minimum retransmission interval from the maximum retransmission interval; and scheduling a heightened priority period for the subscription during the retransmission interval; and receiving the paging message for the subscription in response to determining that the priority of the subscription is greater than or equal to the priority of the at least one competing subscription.

12. The non-transitory processor-readable storage medium of claim 11, wherein the stored processor-executable software instructions are configured to cause a processor of a multi-SIM-multi-standby communication device to perform operations such that:

the retransmission interval overlaps with one or more other retransmission intervals resulting from other paging collisions; and the priority of the subscription is based on a cumulative number of retransmission intervals.

\* \* \* \* \*